United States Patent
Shioura et al.

(10) Patent No.: US 7,613,092 B2
(45) Date of Patent: Nov. 3, 2009

(54) REPRODUCTION APPARATUS AND FOCUS JUMP METHOD

(75) Inventors: Kunihiro Shioura, Kanagawa (JP); Shiro Morotomi, Kanagawa (JP); Hiroshi Oinoue, Tokyo (JP)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 11/101,422

(22) Filed: Apr. 8, 2005

(65) Prior Publication Data

US 2005/0237889 A1 Oct. 27, 2005

(30) Foreign Application Priority Data

Apr. 22, 2004 (JP) .............................. 2004-126371
Feb. 15, 2005 (JP) .............................. 2005-037458

(51) Int. Cl.
*G11B 7/005* (2006.01)

(52) U.S. Cl. ..................................... 369/53.28; 369/94

(58) Field of Classification Search ............. 369/53.23, 369/53.28, 94, 44.11
See application file for complete search history.

(56) References Cited

U.S. PATENT DOCUMENTS

| | | | | | |
|---|---|---|---|---|---|
| 5,903,530 | A | * | 5/1999 | Tateishi et al. ............ | 369/44.27 |
| 6,091,680 | A | * | 7/2000 | Matsuda et al. .......... | 369/44.29 |
| 6,147,942 | A | * | 11/2000 | Abe et al. ................ | 369/44.27 |
| 6,151,280 | A | * | 11/2000 | Naohara et al. .......... | 369/44.27 |
| 6,370,093 | B1 | * | 4/2002 | Tada et al. ............... | 369/44.25 |
| 6,552,971 | B2 | * | 4/2003 | Iida .......................... | 369/44.29 |
| 6,775,208 | B1 | * | 8/2004 | Liu et al. .................. | 369/44.28 |
| 2001/0024408 | A1 | * | 9/2001 | Kobayashi ................ | 369/44.27 |
| 2002/0089912 | A1 | * | 7/2002 | Kobayashi ................ | 369/53.23 |
| 2003/0012096 | A1 | * | 1/2003 | Kitaoka et al. ........... | 369/44.29 |
| 2003/0112720 | A1 | * | 6/2003 | Chiang ..................... | 369/44.29 |
| 2004/0125708 | A1 | * | 7/2004 | Ono ......................... | 369/44.27 |
| 2004/0264312 | A1 | * | 12/2004 | Komma et al. ........... | 369/44.27 |

FOREIGN PATENT DOCUMENTS

| | | |
|---|---|---|
| JP | 59-42649 | 3/1984 |
| JP | 8-115576 | 5/1996 |
| JP | 10-97720 | 4/1998 |
| JP | 11-167725 | 6/1999 |
| JP | 11-316954 | 11/1999 |
| JP | 2000-268372 | 9/2000 |

* cited by examiner

*Primary Examiner*—Wayne R Young
*Assistant Examiner*—Thomas D Alunkal
(74) *Attorney, Agent, or Firm*—Oblon, Spivak, McClelland, Maier & Neustadt, L.L.P.

(57) ABSTRACT

The invention provides a reproduction apparatus that reproduces information recorded in a recording medium having plural recording layers, including: an optical head that irradiates laser beams on the respective recording layers and detects reflected light information to read out information recorded in the respective recording layers; a shaft sliding type focus actuator that holds the object lens; a focus servo section that generates a focus servo drive signal and drives the focus actuator such that a focus state of the laser beams is kept in a state of focus on a recording layer on which the reproduction is performed; and a focus jump control section that generates a kick signal for starting focus jump movement by the focus actuator and a brake signal for ending the focus jump movement.

22 Claims, 22 Drawing Sheets

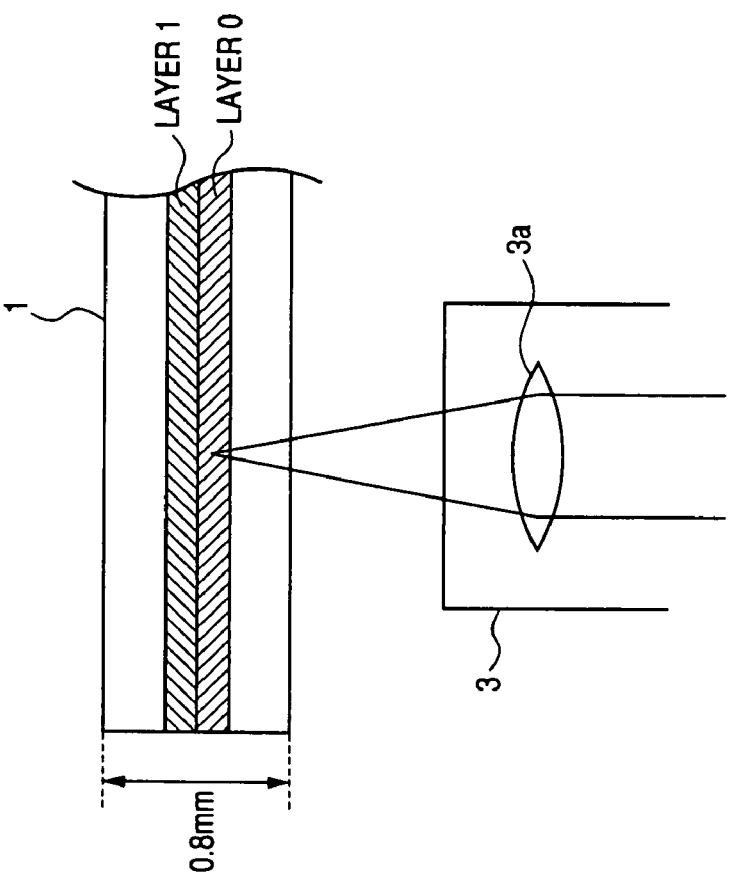
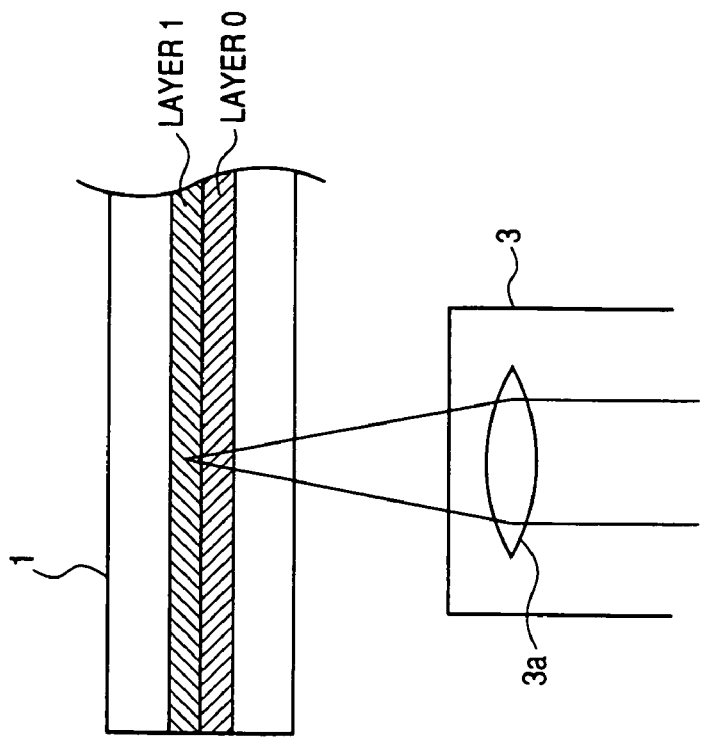

FIG. 8

REGISTER

| NAME | BIT | FUNCTION | SETTING |
|---|---|---|---|
| FJVKS | 8 | KICK START VOLTAGE | 0 TO LESS THAN FULL (256 STAGE SETTING) |
| FJVKE | 8 | KICK END VOLTAGE | 0 TO LESS THAN FULL (256 STAGE SETTING) |
| FJVKAC | 4 | KICK VOLTAGE ACCELERATION | |
| FJVHSL | 1 | KICK HOLD SYSTEM SELECTION | 0: SET VOLTAGE 1: RATIO TO VOLTAGE AT KICK RISE END TIME |
| FJVH | 8 | KICK HOLD VOLTAGE | 0 TO LESS THAN FULL (256 STAGE SETTING) |
| FJVHA | 4 | KICK HOLD VOLTAGE KICK VOLTAGE RATIO | 0 OR LARGER TO 1 (16 STAGE SETTING) |
| FJVBSL | 1 | BRAKE VOLTAGE SYSTEM SELECTION | 0: SET VOLTAGE 1: RATIO TO VOLTAGE AT KICK RISE END TIME |
| FJVB | 8 | BRAKE VOLTAGE SETTING | 0 TO LESS THAN FULL (256 STAGE SETTING) |
| FJVBA | 4 | BRAKE VOLTAGE KICK VOLTAGE RATIO | 0 OR LARGER TO 1 (16 STAGE SETTING) |
| FJFCHS | 3 | FcmpH MASK TIME | 11.337 TO 909.696 (8 STAGE SETTING) |
| FJFCH | 7 | FcmpH SLICE LEVEL | VC TO LESS THAN ADmax (128 STAGE SETTING) |
| FJFCLS | 3 | FcmpL MASK TIME | 11.337 TO 90.696 (8 STAGE SETTING) |
| FJFCL | 7 | FcmpL SLICE LEVEL | 0 OR LARGER TO VC (128 STAGE SETTING) |
| FJMASK | 5 | MASK TIME Tcmp TIME RATIO | 0 TO LESS THAN 2 (32 STAGE SETTING) |
| FJTBSL | 2 | BRAKE PERIOD SYSTEM SELECTION | 0/1: Fcmp EDGE SYNCHRONIZE 2: Tdrv TIME RATIO 3: Tcmp TIME RATIO |
| FJTBA | 5 | BRAKE TIME RATIO | 0 TO LESS THAN 2 (32 STAGE SETTING) |
| FJSQEND | 2 | SEQ END SYSTEM SELECTION | 0/1: BRAKE END 2: Fcmp Edge 3: LATER ONE OF Brake/Fcmp |

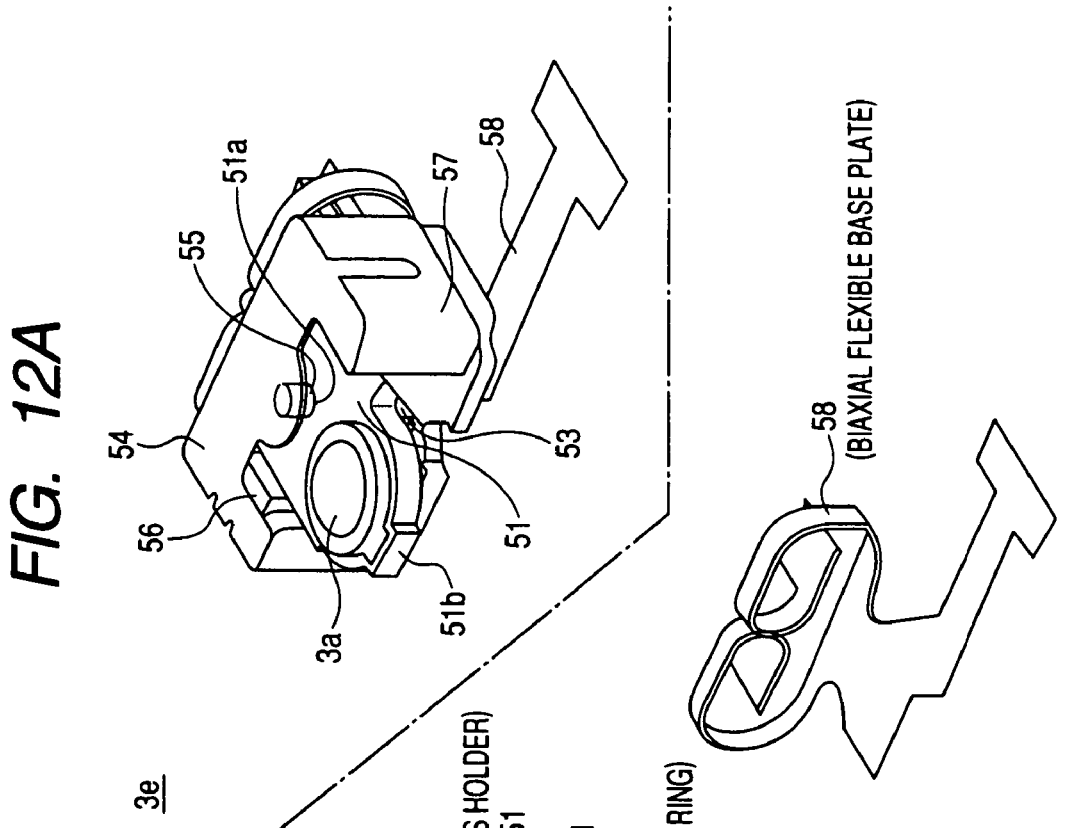
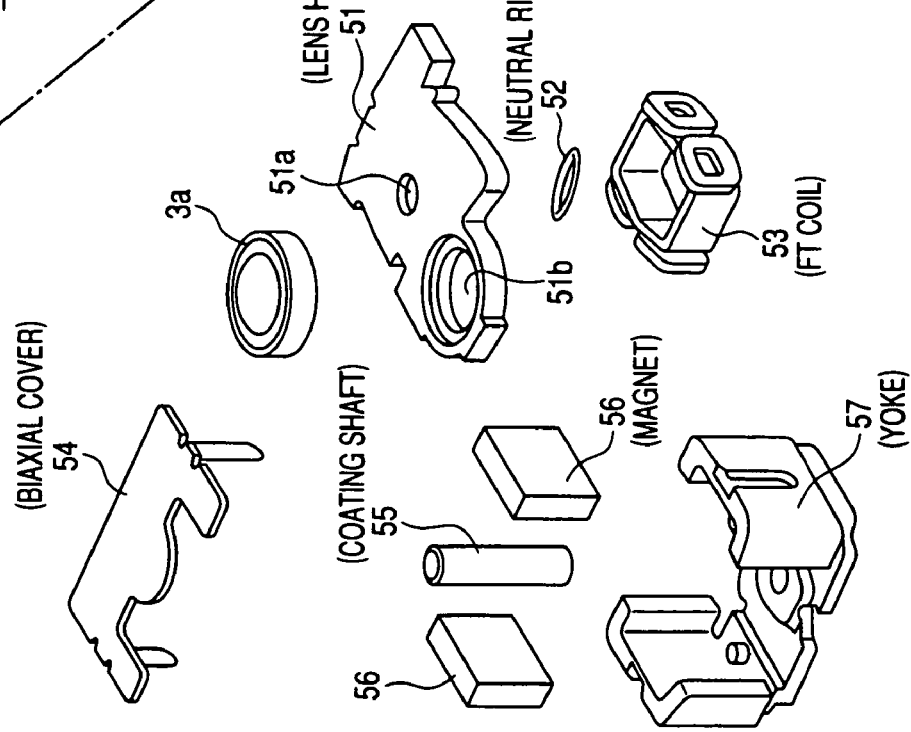

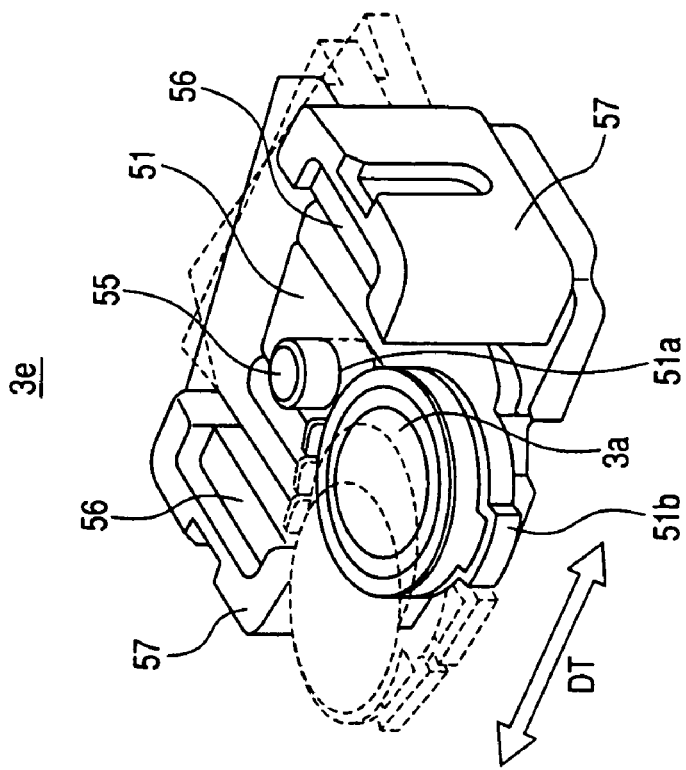
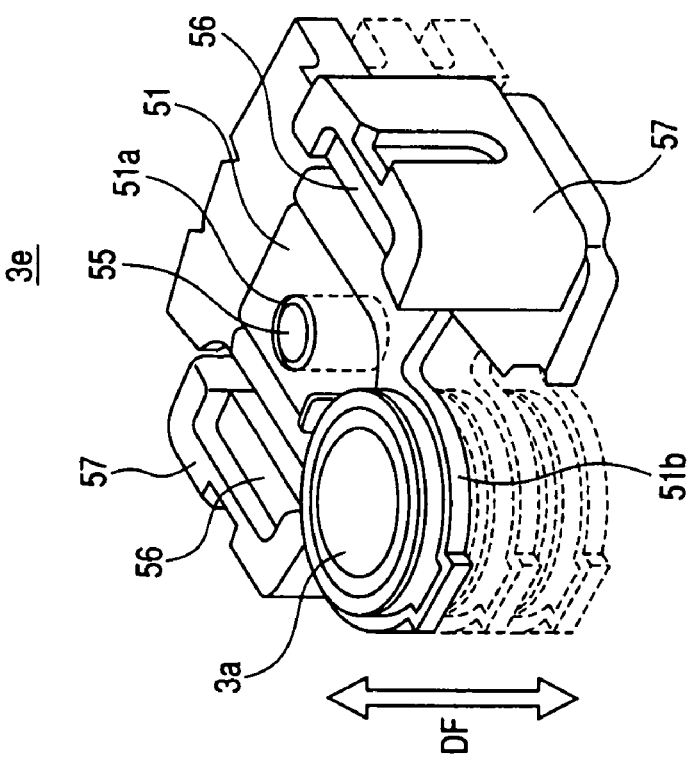

FIG. 14

REGISTER

| NAME | BIT | FUNCTION | SETTING |
|---|---|---|---|
| ☆ FJVKSSL | 1 | KICK START VOLTAGE SYSTEM SELECTION | 0: SET VOLTAGE 1: RATIO TO VOLTAGE AT KICK RISE END TIME OF LAST TIME |
| FJVKS | 8 | KICK START VOLTAGE | 0 TO LESS THAN FULL (256 STAGE SETTING) |
| ☆ FJVKSA | 4 | KICK START VOLTAGE KICK VOLTAGE RATIO | 0 OR LARGER TO 1 (16 STAGE SETTING) |
| FJVKE | 8 | KICK END VOLTAGE | 0 TO LESS THAN FULL (256 STAGE SETTING) |
| FJVKAC | 4 | KICK VOLTAGE ACCELERATION | |
| FJVHSL | 1 | KICK HOLD SYSTEM SELECTION | 0: SET VOLTAGE 1: RATIO TO VOLTAGE AT KICK RISE END TIME |
| FJVH | 8 | KICK HOLD VOLTAGE | 0 TO LESS THAN FULL (256 STAGE SETTING) |
| FJVHA | 4 | KICK HOLD VOLTAGE KICK VOLTAGE RATIO | 0 OR LARGER TO 1 (16 STAGE SETTING) |
| ☆ FJVBSL | 4 | BRAKE VOLTAGE SYSTEM SELECTION | SELECT WITH 4 BIT VALUE (0 TO 15) |
| FJVB | 8 | BRAKE VOLTAGE SETTING | 0 TO LESS THAN FULL (256 STAGE SETTING) |
| FJVBA | 4 | BRAKE VOLTAGE KICK VOLTAGE RATIO | 0 OR LARGER TO 1 (16 STAGE SETTING) |
| FJFCHS | 3 | FcmpH MASK TIME | 11.337 TO 90.696 (8 STAGE SETTING) |
| FJFCH | 7 | FcmpH SLICE LEVEL | VC TO LESS THAN ADmax (128 STAGE SETTING) |
| FJFCLS | 3 | FcmpL MASK TIME | 11.337 TO 90.696 (8 STAGE SETTING) |
| FJFCL | 7 | FcmpL SLICE LEVEL | 0 OR LARGER TO VC (128 STAGE SETTING) |
| FJMASK | 5 | MASK TIME Tcmp TIME RATIO | 0 TO LESS THAN 2 (32 STAGE SETTING) |
| ☆ FJTBSL | 4 | BRAKE PERIOD SYSTEM SELECTION | SELECT WITH 4 BIT VALUE (0 TO 15) |
| ☆ FJTB | 3 | BRAKE TIME | 8 STAGE SETTING |
| FJTBA | 5 | BRAKE TIME RATIO | 0 TO LESS THAN 2 (32 STAGE SETTING) |
| FJSQEND | 2 | SEQ END SYSTEM SELECTION | 0/1: BRAKE END 2: Fcmp Edge 3: LATER ONE OF Brake/Fcmp |

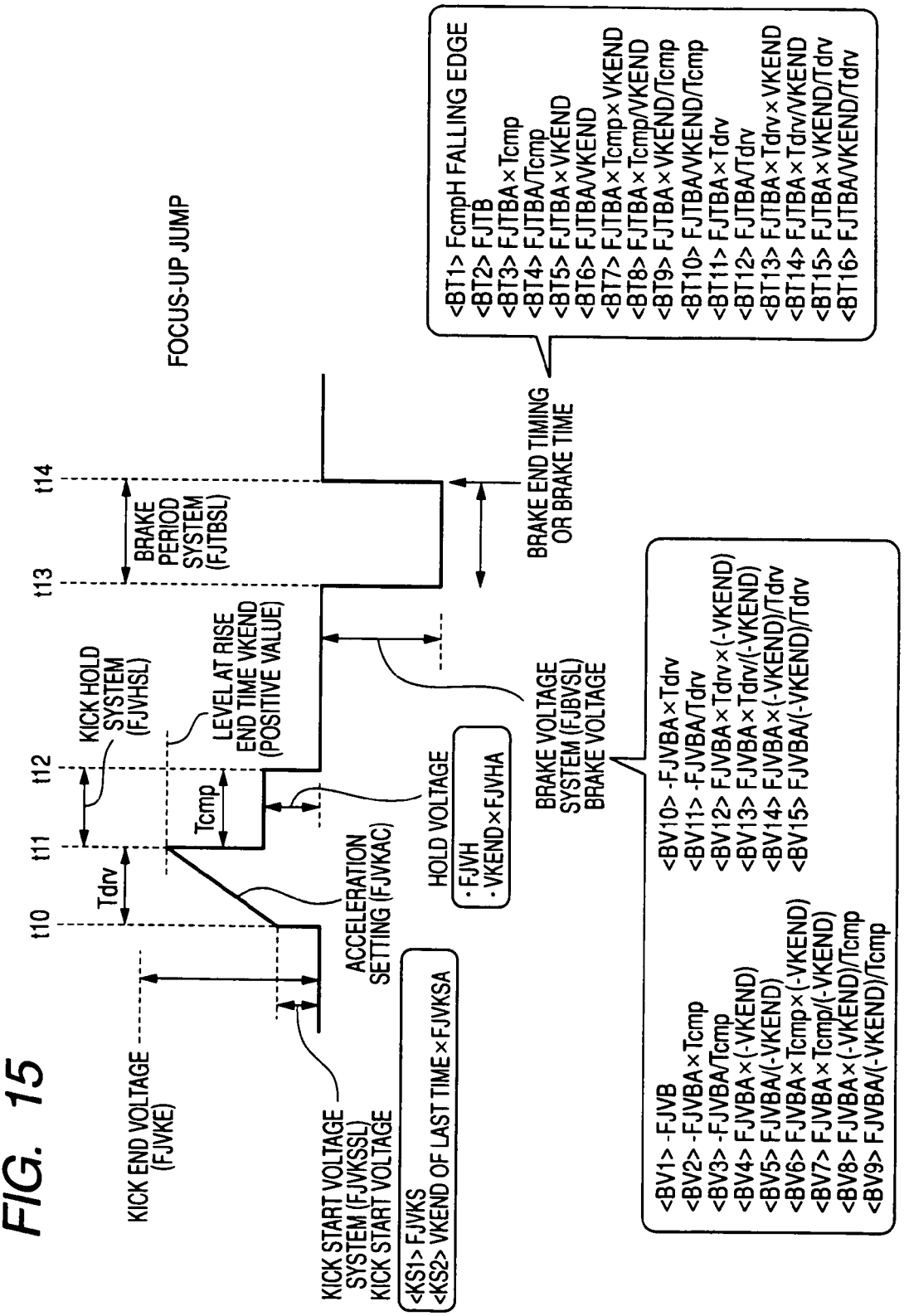

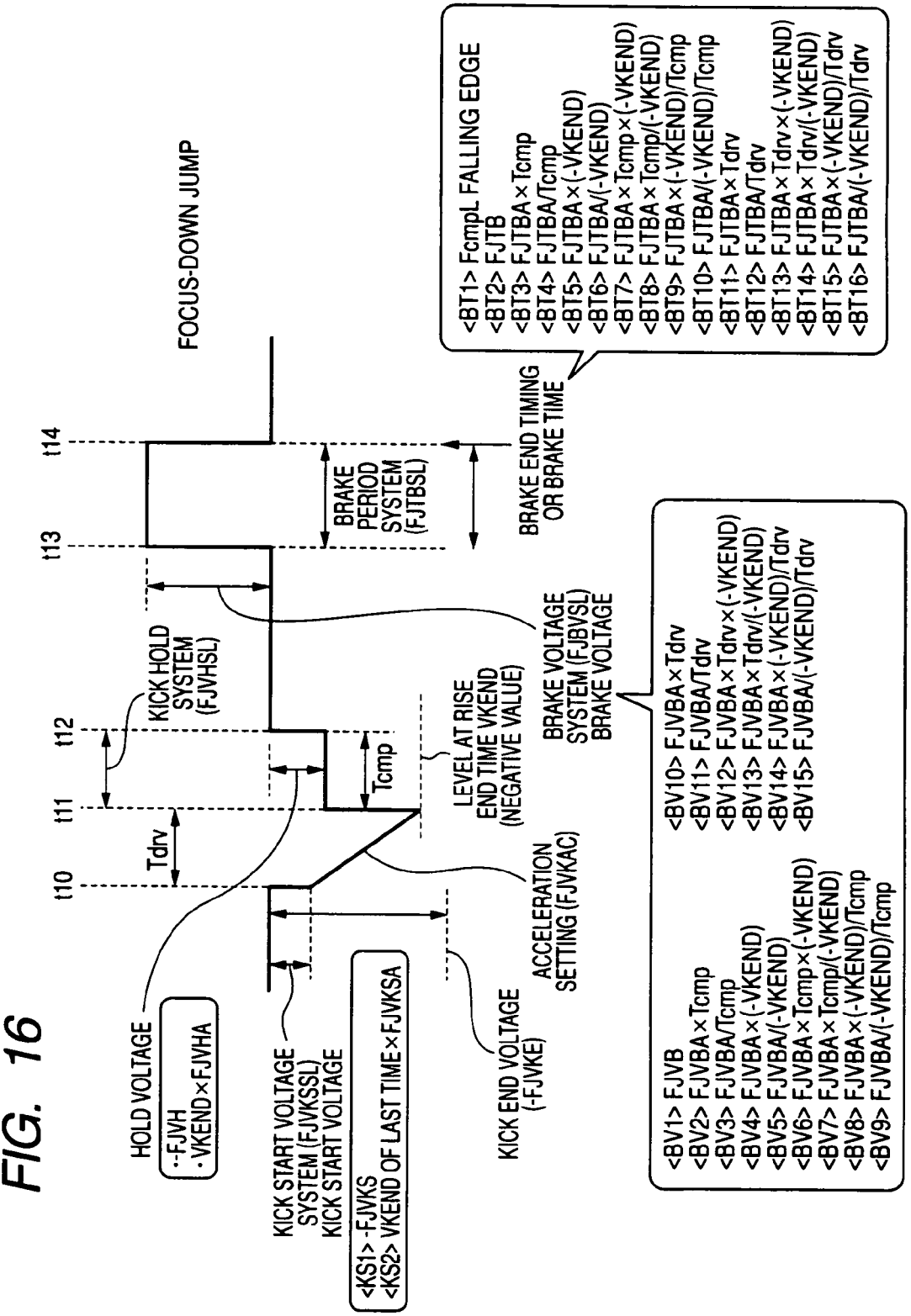

REPRODUCTION APPARATUS AND FOCUS JUMP METHOD

BACKGROUND OF THE INVENTION

1. Field of the Invention

The present invention relates to a reproduction apparatus that reproduces information from a recording media such as an optical disk, which has plural recording layers, and a focus jumping method for the reproduction apparatus.

2. Description of the Related Art

As an optical recording medium capable of recording or reproducing information optically, an optical disk is widely known. A semiconductor laser or the like is used as a light source to irradiate light beams condensed finely via a lens on the optical disk, whereby information is recorded in the optical disk or reproduced from the optical disk. As publicly known, a focus servo operation is performed in order to keep laser beams in a focused state with respect to a recording layer of the optical disk. The focus servo is performed by moving an object lens, which is held by a biaxial mechanism (a biaxial actuator) in an optical head, in a direction in which the object lens approaches and separates from the optical disk, that is, a focus direction, on the basis of a focus error signal.

In recent years, disks having plural recording layers, for example, a two-layer disk and a multilayer disk having three or more layers are developed as optical disks. In that case, in order to shift from a recording/reproduction operation in a certain recording layer to a recording/reproduction operation in another recording layer, focus jump is performed. For example, in order to shift from a state in which the focus servo is being applied in a first layer to a state in which the focus servo is applied in a second layer, focus jump movement of an object lens is performed.

Note that the focus jump is an operation for moving a recording layer serving as a focus position of a laser and is also referred to as layer jump.

JP-A-2002-269770, JP-A-2001-319344, JP-A-2002-279654, and JP-A-11-191222 disclose techniques for operations called focus jump or layer jump.

When the focus jump is performed, an object lens held by a biaxial mechanism is forcibly moved in a focus direction. In that case, a system using a kick pulse and a brake pulse as focus jump drive signals given to the biaxial mechanism has been implemented.

A focus jump operation, which is performed by giving the kick pulse and the brake pulse to the biaxial mechanism, will be explained with reference to FIG. 22.

(f) in FIG. 22 schematically shows a state in which laser beams are focused on a layer 0 of a disk. (g) in FIG. 22 schematically shows a state in which laser beams are focused on a layer 1. An example of focus jump for shifting focus from the state in (f) in FIG. 22 to the layer 1 as shown in (g) in FIG. 22 will be explained.

In the case of (f) in FIG. 22, an object lens 3a is held in a position for focusing laser beams on the layer 0 by a biaxial mechanism 3e. A kick signal is given to the biaxial mechanism 3e in this state to move the object lens 3a upward on the drawing. Thereafter, a brake signal is given to the biaxial mechanism 3e at required timing to decelerate the movement near a focus point of the layer 1 and turn on the focus servo at a certain point. Consequently, the focus jump for bringing laser beams into a state of focus on the layer 1 is completed as shown in (g) in FIG. 22.

(a) in FIG. 22 shows a focus error signal FE that is observed in such an operation.

The focus servo is on and applied to the layer 0 until a point t0 and the focus error signal FE is substantially at a zero level.

At the point t0, the focus servo is turned off. Then, a kick pulse shown in (e) in FIG. 22 is generated as a focus jump drive signal and an electric current corresponding to the kick pulse is fed to a focus coil of the biaxial mechanism 3e whereby the object lens 3a starts moving upward. Therefore, as the focus error signal FE, first, a waveform S0, which is half an S waveform, near a focus position of the layer 0 is observed after the point t0.

When the object lens 3a moves in that state, as the focus error signal FE, a quasi waveform Z may be generated because of, for example, influence of irregular reflection of an interlayer film. However, a waveform S1, which is a former half of the S waveform, is observed near a focus point of the layer 1. Therefore, it is possible to draw focus into the layer 1 if the focus servo is turned on at zero cross timing of the S waveform S1.

In order to perform this operation, first, an FcmpH slice level and an FcmpL slice level are set for the focus error signal FE.

It is possible to obtain an FcmpL signal in (c) in FIG. 22 by comparing the focus error signal FE and the FcmpL slice level. In addition, it is possible to obtain an FcmpH signal in (b) in FIG. 22 by comparing the focus error signal FE and the FcmpH slice level.

It can be confirmed that the movement of the object lens 3a is started if the FcmpL signal rises according to the S waveform S0 of the focus error signal FE after the kick pulse is given. Thus, the kick pulse is ended at rising edge timing of the FcmpL signal.

Thereafter, the object lens 3a continues the movement. When the FcmpH signal rises according to the S waveform S1 of the focus error signal FE, the object lens 3a reaches near the focus point of the layer 1. Thus, a brake pulse is given as a focus jump drive signal at that timing for a certain predetermined period. Then, the movement of the object lens 3a is decelerated. For example, if the FcmpH signal falls, it can be judged that the falling edge is near a zero cross point of the S waveform. Therefore, the focus jump is completed by turning on the focus servo at that timing.

Note that it is possible that the quasi waveform Z is generated and the FcmpH signal builds up before the S waveform S1. Thus, an FcmpH mask period in (d) in FIG. 22 is set only for a required period from the falling edge of the FcmpL signal such that the rising edge of the FcmpH signal due to the quasi waveform Z is not detected.

SUMMARY OF THE INVENTION

Incidentally, as the biaxial mechanism 3e for moving the object lens 3a in a focus direction and a tracking direction, there are known a leaf spring type biaxial mechanism and a shaft sliding type biaxial mechanism. The shaft sliding type biaxial mechanism is easily reduced in size and weight compared with the leaf spring type biaxial mechanism. Thus, the shaft sliding type is widely adopted in small-sized recording/reproduction apparatuses and the like.

An example of a structure of the shaft sliding type biaxial mechanism 3e will be described in detail with reference to FIGS. 12 and 13 later. Briefly, a lens holder holding the object lens 3a rotationally moves in the tracking direction along a shaft body and also slides in the focus direction.

Considering focus jump in the case of the shaft sliding type biaxial mechanism 3e, the lens holder holding the object lens 3a moves while sliding against the shaft body. In that case, an operation of the shaft sliding type biaxial mechanism 3e is affected by friction. The friction in this context means both static friction and dynamic friction. A coefficient of friction fluctuates because of various factors such as an individual difference of the biaxial mechanism 3e, a difference of focus positions on respective layers of a mounted disk, environmental temperature, a state of use and a posture of an apparatus, and aged deterioration.

In other words, even if the kick pulse and the brake pulse are given as described above, a behavior of the object lens 3a is not fixed uniquely.

In the focus jump operation in the past described above, a voltage of the kick pulse is set to a fixed value in design and start of movement and moving speed of the object lens 3a are assumed according to the kick pulse of the voltage. However, the start of movement may be delayed because of influence of the static friction or, even after the start of movement, moving speed may be too high or too low because of influence of the dynamic friction. In other words, depending on a kick pulse of a fixed voltage, the movement of the object lens 3a is unstable. Consequently, frequency irregularity of the S waveform of the measured focus error signal FE also occurs.

If the behavior of the object lens 3a according to the kick pulse is unstable, even if the brake pulse with a voltage and an application period fixed is given, it not always possible to decelerate the movement as expected.

This means that, when the shaft sliding type biaxial mechanism 3e is used, a probability of failure is high in the focus jump executed by giving a fixed kick pulse and a fixed brake pulse to the biaxial mechanism 3e because of the circumstances described above and it is difficult to keep a stable focus jump operation.

Therefore, it is desirable to make it possible to realize stable focus jump regardless of influence of friction that fluctuates because of various factors when the shaft sliding type biaxial mechanism (a focus/tracking actuator) is used.

A reproduction apparatus according to an embodiment of the invention is a reproduction apparatus that reproduces information recorded in a recording medium having plural recording layers. The reproduction apparatus includes: an optical head that irradiates laser beams on the respective recording layers with an object lens as an output end and detects reflected light information of the laser beams to read out information recorded in the respective recording layers; a shaft sliding type focus actuator that holds the object lens to be movable in a direction in which the object lens approaches and separates from the recording medium; a focus servo section that generates a focus servo drive signal on the basis of a focus error signal, which is obtained from the reflected light information read out by the optical head, and drives the focus actuator such that a focus state of the laser beams is kept in a state of focus on a recording layer on which the reproduction is performed; and a focus jump control section that generates a kick signal for starting focus jump movement by the focus actuator and a brake signal for ending the focus jump movement as focus jump drive signals for shifting from the state of focus on a certain recording layer to a state of focus on another recording layer, the kick signal being generated as a signal, a kick drive force of which rises from an initial value.

The focus jump control section ends the increase in the kick drive force when the start of the focus jump movement is confirmed.

The focus jump control section sets the initial value of the kick signal to a calculated value that is calculated using a fixed value set in advance or a value measured at the time of focus jump in the past.

After ending the increase in the kick drive force, the focus jump control section sets the kick signal to a signal for maintaining a set fixed level. Alternatively, after ending the increase in the kick drive force, the focus jump control section sets the kick signal to a signal for maintaining a level that is calculated using a level at the time when the increase is ended.

The focus jump control section sets the brake signal to a signal of a set level. Alternatively, the focus jump control section sets the brake signal to a signal of a level that is calculated using a level at the time when the increase in the kick drive force is ended. Moreover, the focus jump control section sets the brake signal to a signal of a level that is calculated using a time value measured during the period of application of the kick signal.

The focus jump control section generates the brake signal during a period that is calculated using the time value measured during the period of application of the kick signal. Alternatively, the focus jump control section generates the brake signal during a period that is calculated using the level at the time when the increase in the kick drive force is ended.

A focus jump method according to another embodiment of the invention is a focus jump method of giving a focus jump drive signal including a kick signal and a brake signal to a shaft sliding type focus actuator, which holds an object lens serving as an output end of laser beams in a direction in which the object lens approaches and separates from a recording medium, and executing focus jump in order to shift a focus state of laser beams from a state of focus on a certain recording layer to a state of focus on another recording layer with respect to a recording medium having plural recording layers for recording or reproducing information by irradiation of laser beams. The focus jump method includes: a kick drive force increasing step of increasing a kick drive force of the kick signal for causing the focus actuator to start focus jump movement from an initial value; a kick signal level holding step of maintaining the kick signal at a predetermined level; and a brake signal generating step of generating the brake signal for causing the focus actuator to stop the focus jump movement.

The increase in the kick drive force as the kick drive force increasing step is ended when the start of the focus jump movement is confirmed.

In the kick drive force increasing step, the initial value of the kick signal is set to a calculated value that is calculated using a fixed value set in advance or a value measured at the time of focus jump in the past.

The kick signal is set to a set fixed level in the kick signal level holding step. Alternatively, the kick signal in the kick signal level holding step is set to a level that is calculated using the kick signal level at the time of end of the kick drive force increasing step.

In the brake signal generating step, a brake signal of a set level is generated. Alternatively, in the brake signal generating step, a brake signal of a level, which is calculated using the kick signal level at the time of the end of the kick drive force increasing step, is generated. Moreover, in the brake signal generating step, a brake signal of a level, which is calculated using a time value measured during a period as the kick drive force increasing step or the kick signal level holding step, is generated.

In the brake signal generating step, the brake signal is generated during a period that is calculated using a time value measured during a period as the kick drive force increasing step or the kick signal level holding step. Alternatively, in the brake signal generating step, the brake signal is generated during a period that is calculated using the kick signal level at the time of the end of the kick drive force increasing step.

In short, in the embodiment of the invention, a drive force according to a signal level of a kick signal, which is generated in order to start focus jump movement of the object lens, is increased gradually from a certain initial value. Note that the increase in the kick drive force is according to a rise or a fall of a kick signal level depending on a focus jump direction thereof.

In the case of the shaft sliding type focus actuator, a kick drive force, at which movement of the object lens is started, that is, a kick pulse voltage, at which the movement is started, fluctuates according to fluctuation in static friction. By increasing the kick drive fore gradually, the movement of the object lens is started at a point when the kick drive force reaches a level corresponding to a coefficient of static friction at the time when the kick drive force is increased. It can be said that this operation searches a kick voltage level, at which the movement of the object lens is started, and gives a kick signal of an optimum level.

BRIEF DESCRIPTION OF THE DRAWINGS

In the accompanying drawings:

FIGS. 3A and 3B are diagrams for explaining recording layers of the disk in the first embodiment;

FIG. 8 is a table for explaining set values of focus jump in the first embodiment;

FIGS. 12A and 12B are diagrams for explaining a structure of a shaft sliding type biaxial mechanism;

FIGS. 13A and 13B are diagrams for explaining an operation of the shaft sliding type biaxial mechanism;

FIG. 14 is a table for explaining set values of focus jump in a second embodiment of the invention;

FIG. 15 is a diagram for explaining a drive signal waveform at the time of focus-up jump in the second embodiment;

FIG. 16 is a diagram for explaining a drive signal waveform at the time of focus-down jump in the second embodiment;

DESCRIPTION OF THE PREFERRED EMBODIMENTS

Embodiments of the present invention will be hereinafter explained in the following order.

First Embodiment

[1-1: Reproduction apparatus and disk]
[1-2: Shaft sliding type biaxial mechanism]
[1-3: Structure of a focus control system]
[1-4: Focus-up jump operation]
[1-5: Focus-down jump operation]
[1-6: Advantages and modifications of the first embodiment]

Second Embodiment

[2-1: Focus jump drive signal setting]
[2-2: Focus-up jump operation]
[2-3: focus-down jump operation]
[2-4: Advantages and modifications of the second embodiment]

First Embodiment

[1-1: Reproduction Apparatus and Disk]

Figure 1:
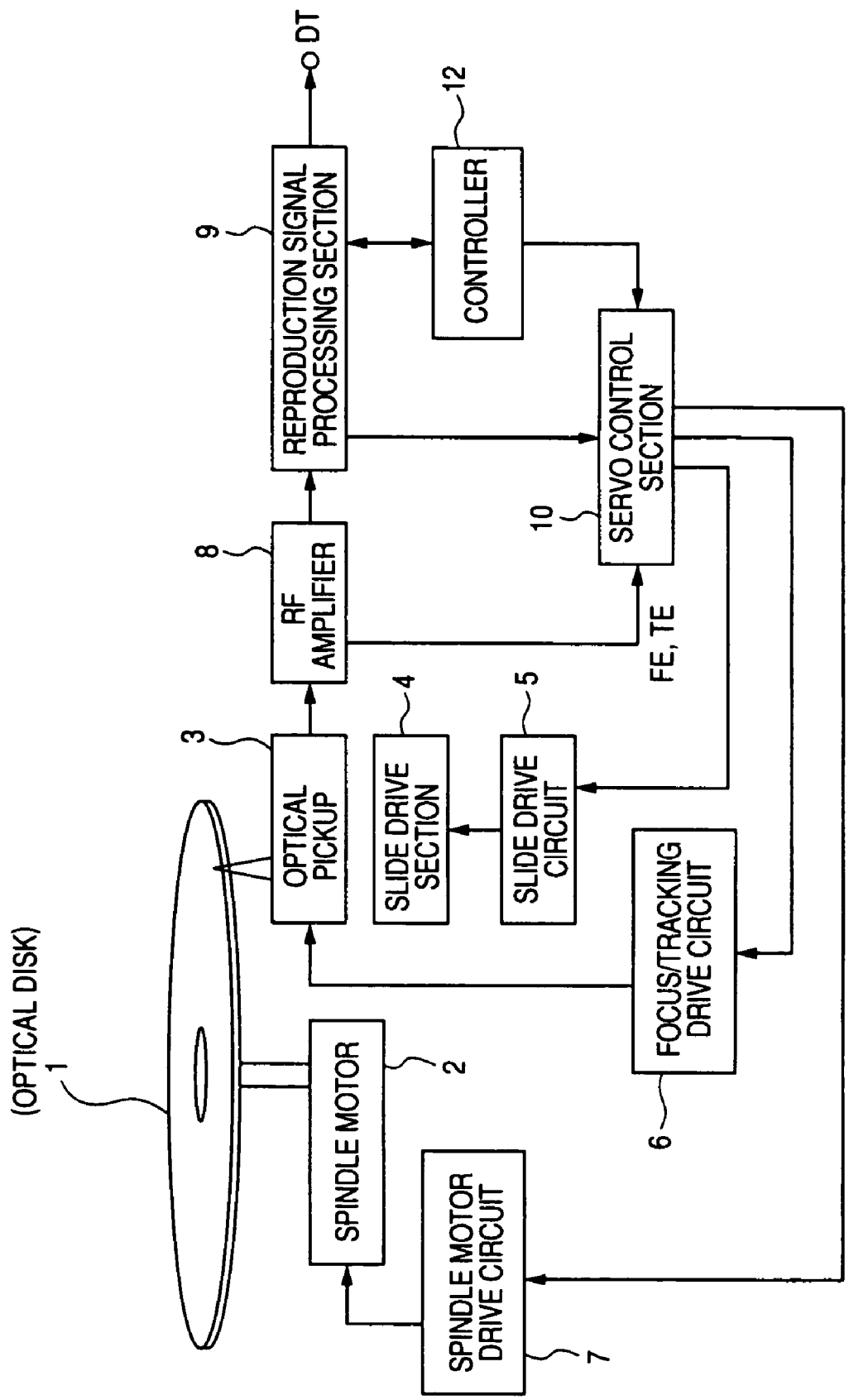
FIG. 1 is a block diagram of a reproduction apparatus in a first embodiment of the invention.

FIG. 1 is a block diagram of a reproduction apparatus in a first embodiment of the invention. FIG. 2, FIGS. 3A and 3B, and FIGS. 4A and 4B show a disk and recording layers of the disk from which the reproduction apparatus in this embodiment reproduces information.

First, a disk 1 will be explained with reference to FIG. 2, FIGS. 3A and 3B, and FIGS. 4A and 4B.

Figure 2:
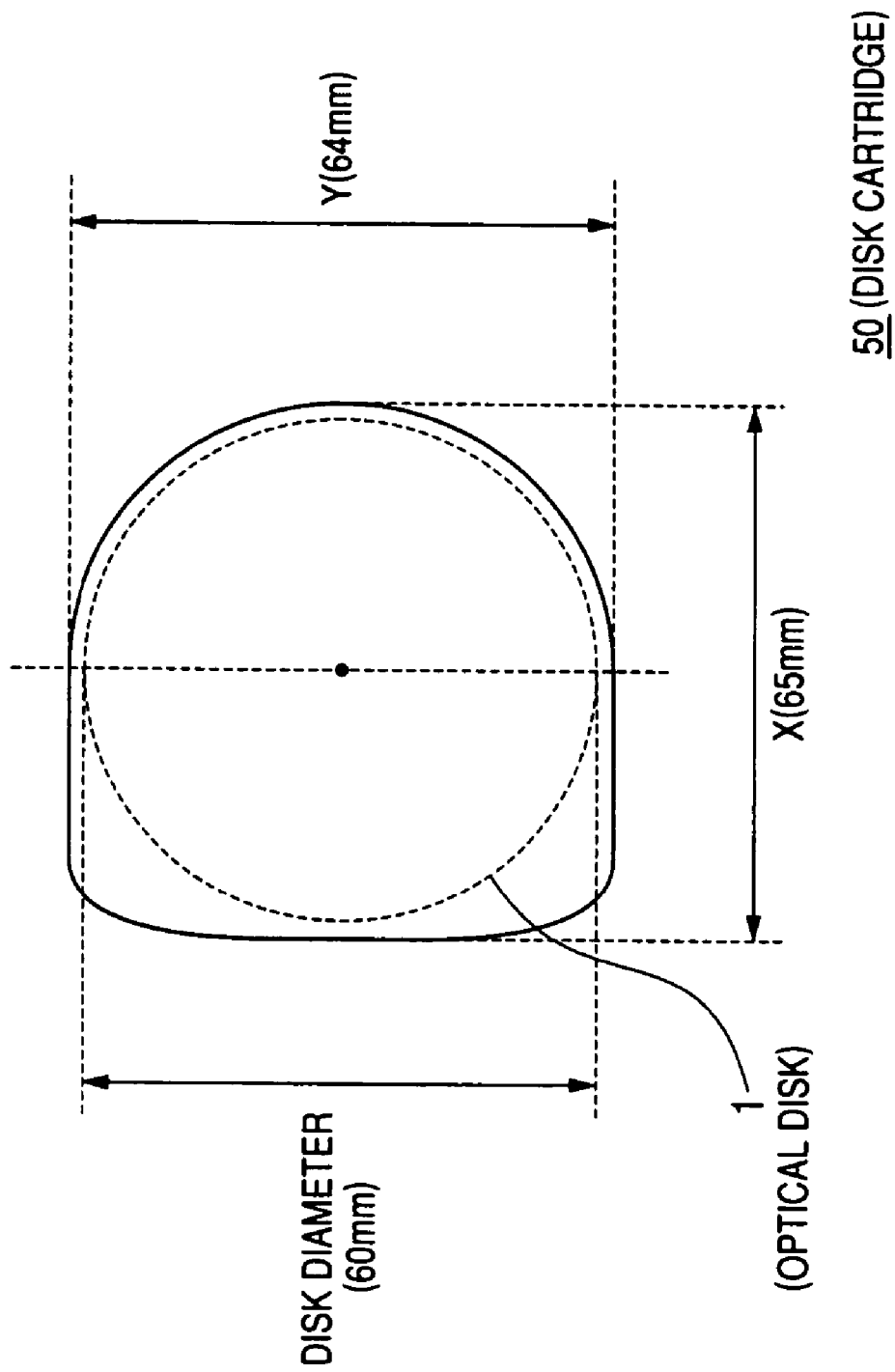
FIG. 2 is a diagram for explaining a structure of a disk in the first embodiment.

As shown in FIG. 2, the disk 1 is adapted to be housed in a disk cartridge 50.

The disk 1 is housed in the disk cartridge 50 as indicated by a broken line in the figure. The disk 1 has a diameter of about 60 mm and has a data storage capacity of about 1.6 GB (gigabyte) according to, for example, a two-layer recording system.

As shown in the figure, the disk cartridge 50 is formed in a semicircular shape along an arc of the disk 1 housed therein in one half side on a plane thereof. In addition, in another half side, the disk cartridge 50 is formed in substantially a square shape with two corners formed in substantially a rounded C shape on an external side. A size in an X direction is set to about 65 mm and a size in a Y direction is set to about 64 mm in the figure.

As shown in FIGS. 3A and 3B, the disk 1 has a layer 0 and a layer 1 as two recording layers. The disk 1 has a structure in which disks with a thickness of, for example, 0.4 mm are stuck together. Thus, a thickness of the disk 1 is 0.8 mm.

The layer 0 and the layer 1 are formed in order from a disk surface side on which laser beams are irradiated by an optical pickup 3 of the reproduction apparatus.

In reproducing information from such a two-layer disk, laser beams, which are emitted from the optical pickup 3 via an object lens 3a, are focused on one of the recording layers to read out reflected light information from the recording layer. FIG. 3A shows a state of focus on the layer 0 at the time of reproduction and FIG. 3B shows a state of focus on the layer 1 at the time of reproduction.

Figure 4:
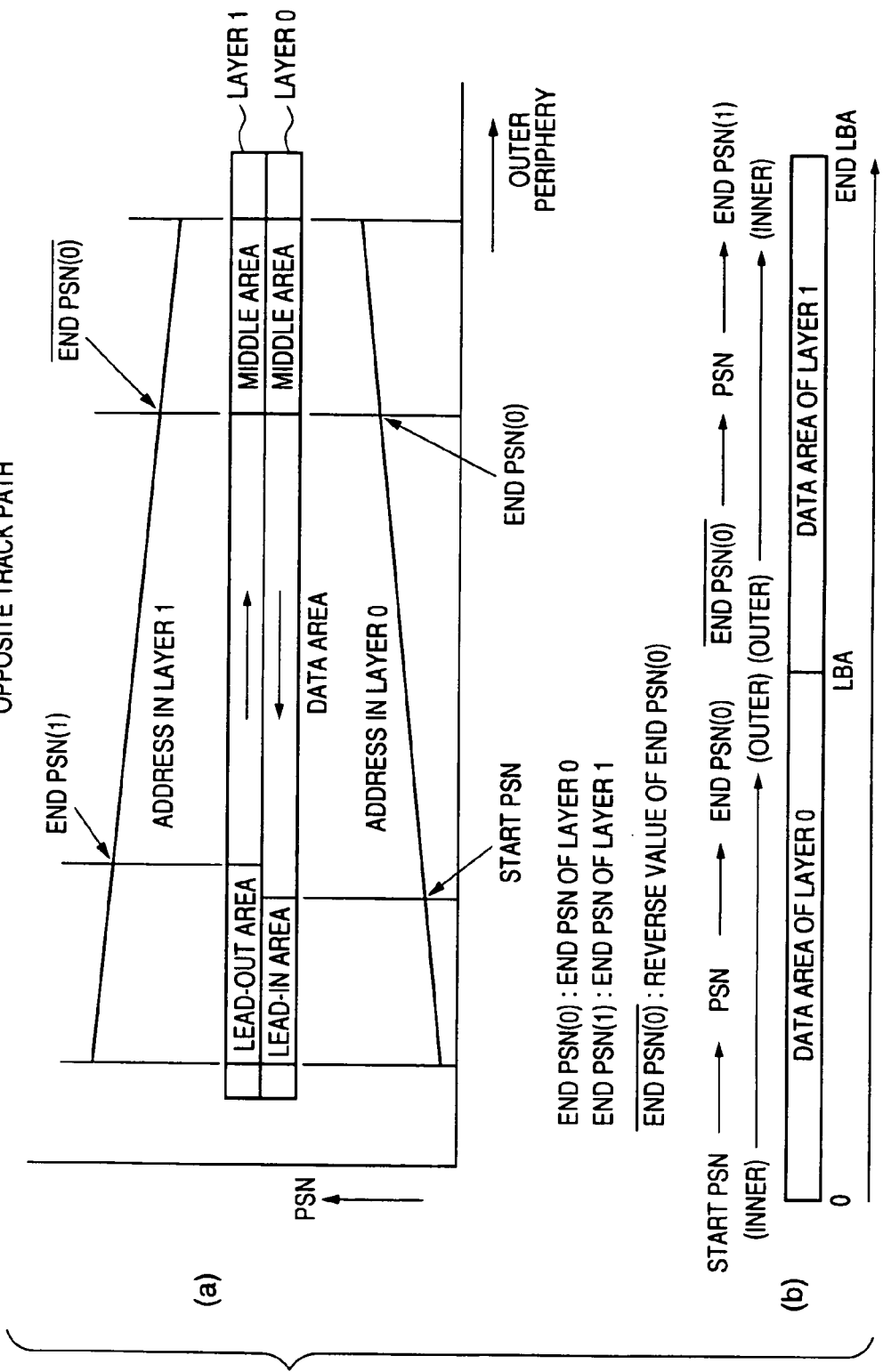
FIGS. 4A and 4B are diagrams for explaining an address structure of recording layers of the disk in the first embodiment.

FIG. 4 schematically shows the respective layers and addresses thereof.

In the case of the two-layer disk, two recording systems, namely, a parallel track path and an opposite track path are possible. In this embodiment, the opposite track path is cited as an example.

In the case of the opposite track path, as shown in the figure, a recording order of data, that is, addressing starts from an inner periphery of the layer 0 and proceeds to the end of the layer 0 and, then, proceeds from an outer periphery of the layer 1 to the inner periphery.

As the addresses, Physical Sector Numbers (PSNs) are given as actual addresses recorded on a disk surface. On the other hand, as addresses affixed to a list of logical data handled in a host apparatus such as a computer, Logical Block Numbers (LBAs) are given. The PSNs and the LBAs are associated in a one-to-one relation.

As shown in the figure, in the case of the opposite track path, a lead-in area, a data area, and a middle area are formed from the inner peripheral side to the outer peripheral side in the layer 0. A middle area, a data area, and a lead-out area are formed from the outer peripheral side to the inner peripheral side in the layer 1.

Management information for recording and reproduction of actual data in the disk, physical information of the disk, and the like are recorded in the lead-in area.

Dummy data is recorded in the middle area and the lead-out area. Note that management information and the like may be recorded therein.

User data, which is the actual data, that is, main recording and reproduction data, is recorded from Start PSN in the inner periphery of the layer 0 to End PSN(0) that is the end of the data area of the layer 0. Subsequently, the user data is recorded from the outer peripheral side of the data area of the layer 1 (reverse End PSN(0)) to End PSN(1) on the inner peripheral side.

As shown in FIG. 4B, the logical block addresses LBAs are allocated in order continuously, that is, allocated continuously from the inner peripheral side to the outer peripheral side of the layer 0 and, then, turned back and allocated the outer peripheral side to the inner peripheral side in the layer 1.

A structure of the reproduction apparatus will be explained with reference to FIG. 1.

The disk 1 described above is mounted on a not-shown turntable and is driven to rotate at a constant linear velocity (CLV) or a constant angular velocity (CAV) by a spindle motor 2 at the time of a reproduction operation. Then, data recorded in the disk 1, for example, in an emboss pit format is read out by the pickup (the optical head) 3.

Note that, here, as an example, a read-only disk, that is, a ROM type disk, in which data is recorded in the emboss pit format, is assumed as the disk 1. However, for example, a write once type disk, in which pit marks are formed in a pigment change pit format, or a rewritable disk, in which pit marks are formed in a phase change pit format, a magnetic field pit format, or the like, are also possible. It is also conceivable to adopt the reproduction apparatus in this embodiment as a reproduction apparatus for those recordable disks.

Figure 5:
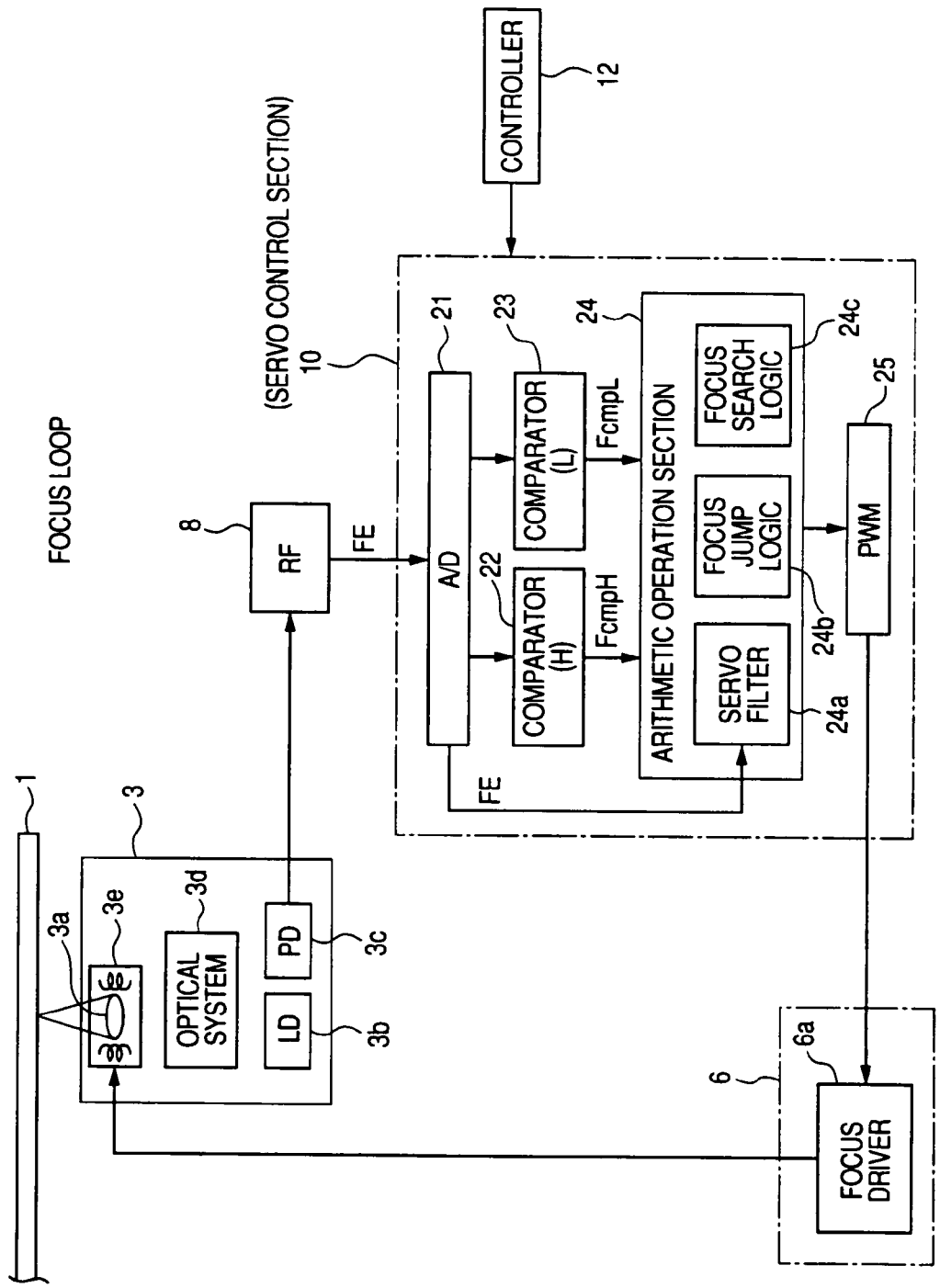
FIG. 5 is a block diagram of a focus control system in the first embodiment.

As schematically shown in FIG. 5, a laser diode 3b serving as a laser beam source, a photo-detector 3c for detecting reflected light, an object lens 3a serving as an output end of laser beams, an optical system that irradiates the laser beams on a disk recording surface via the object lens 3a and guides reflected light of the laser beams to the photo-detector 3c, a biaxial mechanism 3e that holds the object lens 3a so as to be movable in a tracking direction and a focus direction, and the like are formed in the pickup 3. In this embodiment, the biaxial mechanism 3e is constructed as a shaft sliding type.

The entire pickup 3 is made movable in a disk radial direction by a slide drive section 4.

Reflected light information from the disk 1 is detected by the photo-detector 3, changed to an electric signal corresponding to an amount of received light, and supplied to an RF amplifier 8.

The RF amplifier 8 shown in FIG. 1 includes a current voltage conversion circuit, a matrix operational amplifier circuit, and the like in association with output currents from plural photo-detectors 3c in the pickup 3. The RF amplifier 8 generates a necessary signal according to matrix operation processing. The RF amplifier 8 generates an RF signal serving as reproduction data, a focus error signal FE and a tracking error signal TE for servo control, and the like.

The reproduction RF signal outputted from the RF amplifier 8 is supplied to a reproduction signal processing section 9 and the focus error signal FE and the tracking error signal TE are supplied to a servo control section 10.

The reproduction RF signal obtained by the RF amplifier 8 is subjected to binarization, PLL clock generation, decode processing, error correction processing, and the like in the reproduction signal processing section 9. Reproduction data DT from the disk 1 is obtained by these pieces of processing and outputted to a predetermined portion or an external apparatus.

In addition, the reproduction signal processing section 9 extracts sub-code information and address information from information obtained by decoding and error correction applied to the RF signal and supplies these pieces of information to a controller 12.

The controller 12 is formed by, for example, a microcomputer and performs control for the entire apparatus.

The servo control section 10 is formed by, for example, a Digital Signal Processor (DSP). The servo control section 10 generates various servo derive signals such as focus, tracking, thread, and spindle signals from the focus error signal FE and the tracking error signal TE received from the RF amplifier 8 and a spindle error signal SPE or the like from the reproduction signal processing section 9 or the controller 12 to execute a servo operation.

In other words, the servo control section 10 generates a focus drive signal and a tracking drive signal in response to the focus error signal FE and the tracking error signal TE and supplies the focus drive signal and the tracking drive signal to a focus/tracking drive circuit 6. The focus/tracking drive circuit 6 drives a focus coil and a tracking coil of the biaxial mechanism 3e in the pickup 3. Consequently, a tracking servo loop and a focus servo loop are formed by the pickup 3, the RF amplifier 8, the servo control section 10, the focus/tracking drive circuit 6, and the biaxial mechanism 3e.

Note that, in turning on the focus servo, first, a focus search operation has to be executed. The focus search operation is an operation for detecting a position, where a zero cross point of an S waveform of the focus error signal FE can be obtained, while forcibly moving an object lens in a state in which the focus servo is off. As publicly known, linear areas in front of and behind the zero cross point in the S waveform of the focus error signal are areas in which a position of the object lens 3a can be drawn into a focus position by closing the focus servo loop. Therefore, the focus servo is turned on at timing of the zero cross point while forcibly moving the object lens 3a as the focus search operation, whereby a focus servo operation holding a laser spot in a focus state is realized after the focus servo is turned on.

In the case of this embodiment, the disk 1 is formed in the two-layer structure including the layer 0 and the layer 1 as described above.

Naturally, when recording and reproduction are applied to the layer 0, laser beams has to be focused on the layer 0. When recording and reproduction are applied to the layer 1, laser beams has to be focused on the layer 1.

Movement of a focus position between the layer 0 and the layer 1 is performed by a focus jump operation.

The focus jump operation is executed by, when laser beams are focused on one layer, turning off the focus servo to forcibly move the object lens 3a and turning on the focus servo at timing of the zero cross point of the S waveform with respect to the other layer. Details of the focus-jump operation in this embodiment will be described later.

The servo control section 10 supplies a spindle drive signal, which is generated in response to the spindle error signal, to a spindle motor drive circuit 7. The spindle motor drive circuit 7 applies, for example, a three-phase drive signal to the spindle motor 2 in response to the spindle drive signal to execute rotation of the spindle motor 2. In addition, the servo control section 10 generates a spindle drive signal in response to a spindle kick/brake control signal from the controller 12 and executes operations such as start, stop, acceleration, and deceleration of the spindle motor 2 by the spindle motor drive circuit 7.

Further, the servo control section 10 generates a slide drive signal on the basis of, for example, a slide error signal obtained as a low-frequency component of the tracking error signal TE or access execution control from the controller 12 and supplies the slide drive signal to a slide drive circuit 5. The slide drive circuit 5 drives the slide drive section 4 in response to the slide drive signal. Although not shown in the figure, the slide drive section 4 has a mechanism including a main shaft, a thread motor, and a transmission gear for holding the pickup 3. The slide drive circuit 5 drives the slide drive section 4 in response to the slide drive signal, whereby required slide movement of the pickup 3 is performed.

[1-2: Shaft Sliding Type Biaxial Mechanism]

The biaxial mechanism 3e in the reproduction apparatus in this embodiment is a shaft sliding type biaxial mechanism. An example of a structure of the shaft sliding type biaxial mechanism 3e will be explained with reference to FIGS. 12A and 12B and FIGS. 13A and 13B.

FIG. 12A is a perspective view of the biaxial mechanism 3e and FIG. 12B is a perspective view of components constituting the biaxial mechanism 3e.

The biaxial mechanism 3e includes a lens holder 51, a neutral ring 52, an FT coil 53, a biaxial cover 54, a coating shaft 55, magnets 56, a yoke 57, and a biaxial flexible substrate 58.

The coating shaft 55 is arranged in the center of a bottom surface of the yoke 57. The pair of magnets 56, 56 are arranged on the left and the right inside the yoke 57. The biaxial cover 54 is arranged on an upper surface of the yoke 57.

The object lens 3a is fixed to and held at a top end 51b of the lens holder 51. A hole 51a is formed in the central part of the lens holder 51. Further, the neutral ring 52 and the FT coil 53 are fixed on a lower surface side of the lens holder 51.

The lens holder 51 with the FT coil 53 fixed thereto is arranged inside in a state in which the coating shaft 55 is inserted through the hole 51a thereof. In this state, a coil portion of the FT coil 53 and the magnets 56 are opposed to each other. A focus coil and a tracking coil are formed in the FT coil 53. An electric current is applied to the respective coils by a biaxial flexible base plate 58.

In the biaxial mechanism 3e with such a structure, as shown in FIG. 13A, the lens holder 51 slides relatively to the coating shaft 55 in a vertical direction according to the application of an electric current to the focus coil. Consequently, the object lens 3a held by the lens holder 51 is moved in a focus direction DF.

In addition, as shown in FIG. 13B, the lens holder 51 moves rotationally around the coating shaft 55 according to the application of an electric current to the tracking coil. Consequently, the object lens 3a is moved in a tracking direction DT.

[1-3: Structure of a Focus Control System]

A structure of a focus loop will be explained with reference to FIG. 5.

In FIG. 5, as the servo control section 10, only a focus control system therein is shown. As the focus/tracking drive circuit 6, only a focus driver 6a is shown.

The focus control system in this context is a system for performing focus servo, focus search, and focus jump. Therefore, the servo control section 10 includes an A/D conversion section 21, comparators 22 and 23, an arithmetic operation section 24, and a PWM modulation section 25.

The structure in the pickup 3 is described above. The object lens 3a is moved by the shaft sliding type biaxial mechanism 3e in the focus direction.

The focus error signal FE, which is obtained by applying arithmetic operation processing in the RF amplifier 8 to a signal received by the photo-detector 3c, is converted into digital data by the A/D conversion section 21 in the servo control section 10 and supplied to the arithmetic operation section 24 and the comparators 22 and 23.

The arithmetic operation section 24 has an arithmetic operation function as a servo filter 24a, a focus jump logic 24b, and a focus search logic 24c.

The servo filter 24a is a function of applying filtering processing for phase compensation or the like to the focus error signal FE to generate a focus servo signal.

When the focus servo loop is on, the focus servo signal, which is generated by the servo filter 24a on the basis of the focus error signal FE, is supplied to the PWM modulation section 25 and changed to a PWM signal. The PWM signal is supplied to the focus driver 6a of the focus/tracking drive circuit 6. The focus driver 6a applies an electric current to the focus coil of the biaxial mechanism 3e on the basis of the supplied PWM signal. Consequently, the focus servo operation for keeping a state of focus on the recording layers is performed.

The focus search logic 24c generates a drive signal for focus search and outputs the drive signal. When up-search is performed as the focus search, the focus search logic 24c generates a signal that is given to the biaxial mechanism 3e in order to forcibly drive the object lens 3a in a direction in which the object lens 3a approaches the disk from a position distant from the disk. In addition, when down-search is performed, the focus search logic 24c generates a signal that is given to the biaxial mechanism 3e in order to forcibly drive the object lens 3a in a direction in which the object lens 3a is moved away from a position close to the disk.

In the focus search, the focus servo is turned off and a search signal generated by the focus search logic 24c is changed to a PWM signal by the PWM modulation section 25 and supplied to the focus driver 6a. The focus driver 6a gives a drive current corresponding to the PWM signal to the focus coil of the biaxial mechanism 3e, whereby the object lens 3a is moved for search.

The focus jump logic 24b generates and outputs a focus jump drive signal. The focus jump logic 24b generates a kick pulse and a brake pulse as a focus jump drive signal as explained below in detail.

The focus error signal FE converted into the digital data by the A/D conversion section 21 is compared with an FcmpH slice level set to a predetermined level in the comparator 22 and an FcmpH signal is outputted. Similarly, the focus error signal FE is compared with an FcmpL slice level set to a predetermined level in the comparator 23 and an FcmpL signal is outputted.

The focus jump logic 24b generates a kick pulse and a brake pulse using the FcmpH signal and the FcmpL signal from the comparators 22 and 23.

A focus jump drive signal according to the kick pulse and the brake pulse is changed to a PWM signal by the PWM modulation section 25 and the PWM signal is supplied to the focus driver 6a. The focus driver 6a gives a drive current corresponding to the PWM signal to the focus coil of the biaxial mechanism 3e, whereby the object lens 3a performs a focus jump operation.

Note that the controller 12 instructs start of the focus jump processing by the focus jump logic 24b and the focus search processing by the focus search logic 24c.

[1-4: Focus-Up Jump Operation]

The focus jump will be hereinafter explained in detail. First, a focus-up jump operation for shifting from the layer 0 to the layer 1 will be described with reference to FIGS. 6 and 7.

Figure 6:
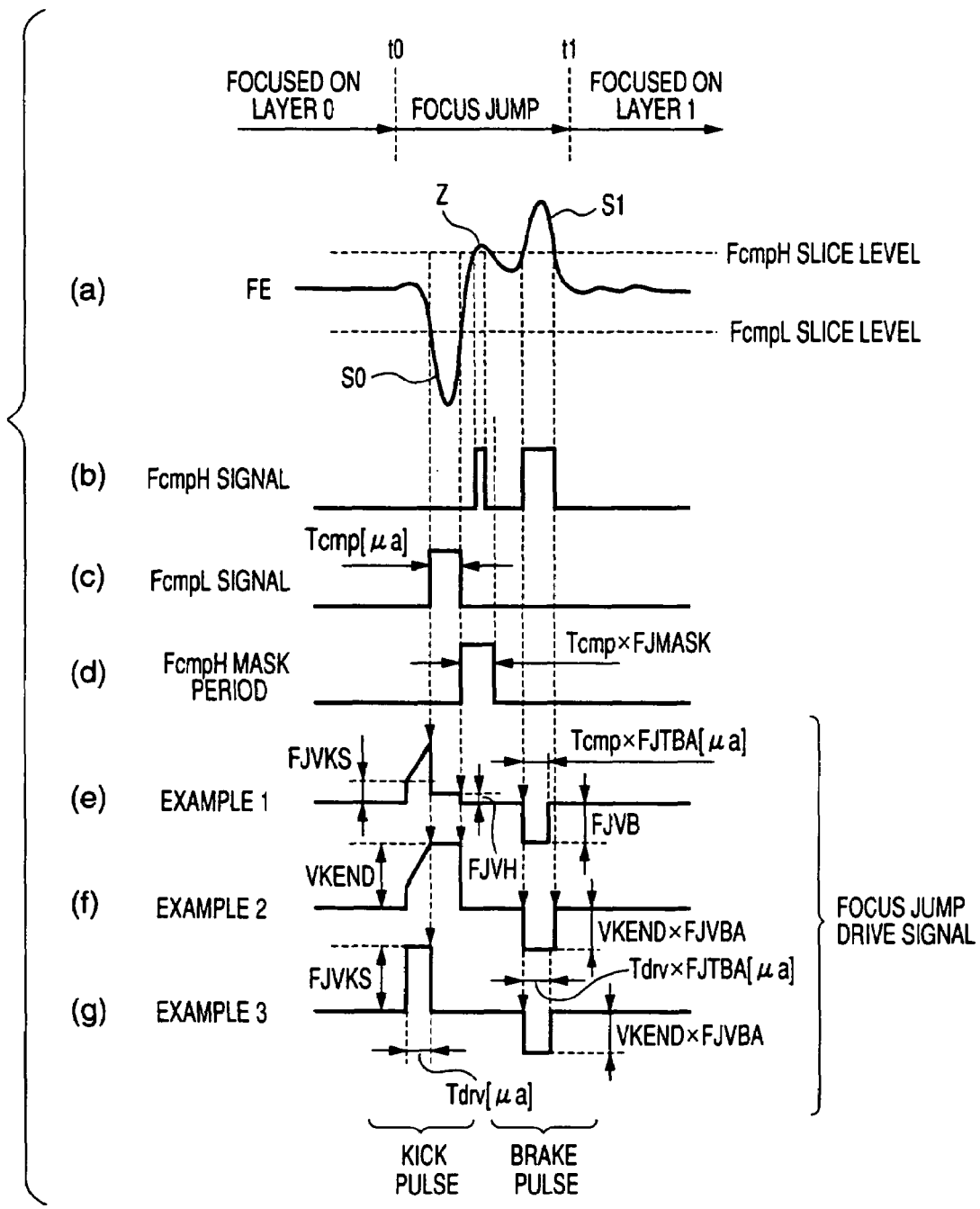
FIG. 6 is a diagram for explaining an operation at the time of focus-up jump in the first embodiment.

(a) in FIG. 6 shows a focus error signal FE that is observed at the time of focus-up jump started by giving a kick pulse from a point t0.

The comparators 22 and 23 shown in FIG. 5 compares the focus error signal FE with the FcmpH slice level and the FcmpL slice level set to levels shown in the figure. The comparators 22 and 23 output an FcmpH signal in (b) and an FcmpL signal in (c) in FIG. 6 as a binary signal of a result of the comparison.

Figure 22:
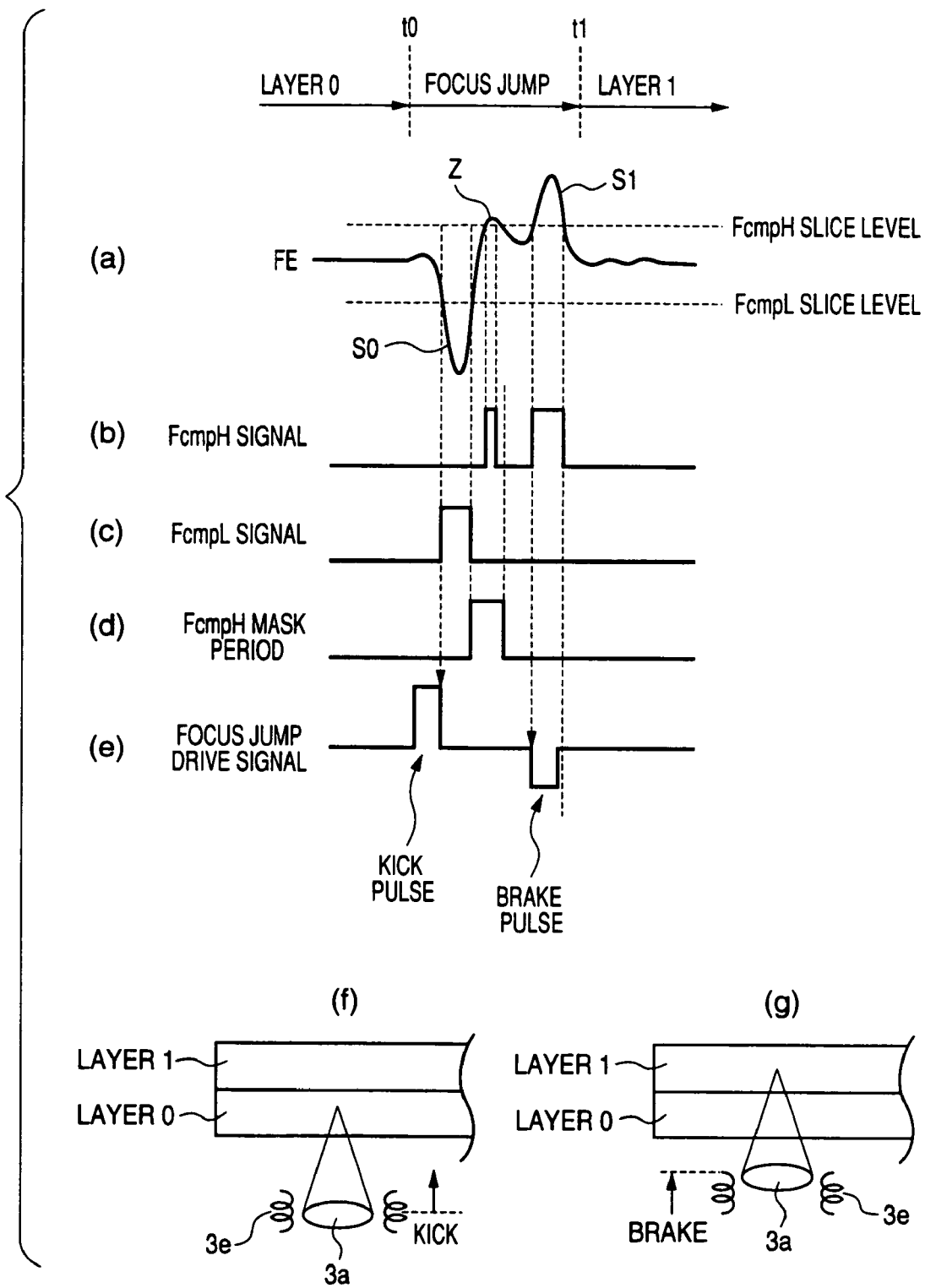
FIG. 22 is a diagram for explaining a focus jump operation in the past.

The focus jump operation in this embodiment is basically the same as the operation explained with reference to FIG. 22 except waveforms of focus jump drive signals (e), (f), and (g) in FIG. 6).

In short, at a point t0, the focus servo is turned off, a kick pulse indicated as a focus jump drive signal is generated, and an electric current corresponding to the kick pulse is fed to the focus coil of the biaxial mechanism 3e, whereby the object lens 3a starts moving upward. Therefore, as the focus error signal FE, first, a waveform S0, which is half an S waveform, near a focus position of the layer 0 is observed after the point t0. Note that a difference of examples of kick pulses in (e), (f), and (g) in FIG. 6 will be described later.

When the object lens 3a moves in that state, as the focus error signal FE, a quasi waveform Z may be generated because of, for example, influence of irregular reflection of an interlayer film, but a waveform S1, which is a former half of the S waveform, is observed near a focus point of the layer 1. Therefore, it is possible to drawn focus into the layer 1 by turning on the focus servo near a zero cross timing of the S waveform S1.

It can be confirmed that the movement of the object lens 3a is started if the FcmpL signal rises according to the S waveform S0 of the focus error signal FE after the kick pulse is given at the point t0.

Thereafter, the object lens 3a continues the movement. When the FcmpH signal rises according to the S waveform S1 of the focus error signal FE, it can be confirmed that the object lens 3a reaches near the focus point of the layer 1. Thus, a brake pulse is given as a focus jump drive signal at that timing. Then, the movement of the object lens 3a is decelerated. For example, the focus jump is completed by turning on the focus servo at timing of a falling edge of the FcmpH signal.

Note that it is possible that the quasi waveform Z is generated and the FcmpH signal rises before the S waveform S1. Thus, an FcmpH mask period in (d) in FIG. 6 is set only for a required period from the falling edge of the FcmpL signal such that the rising edge of the FcmpH signal due to the quasi waveform Z is not detected.

Here, the focus jump drive signal generated by the focus jump logic 24b in this embodiment can be set to various different waveforms according to a setting state. Examples of the different waveform settings are shown as (e), (f), and (g) in FIG. 6.

Figure 7:
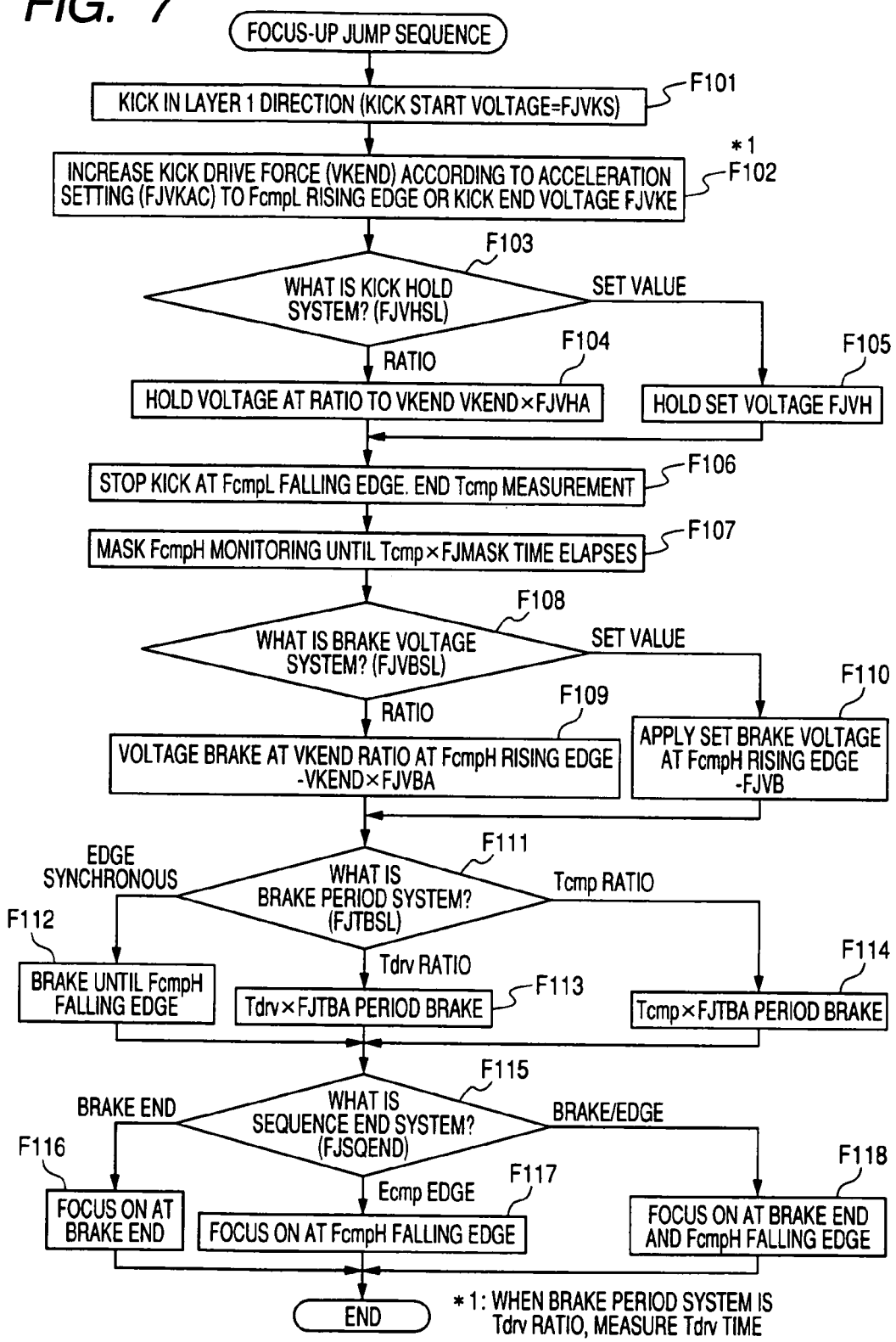
FIG. 7 is a flowchart of focus-up jump processing in the first embodiment.

The focus jump logic 24b generates the focus jump drive signal including the kick pulse and the brake pulse by performing processing in FIG. 7 using the FcmpH signal, FcmpL signal, and set values of various registers. It is possible to set a waveform of the focus jump drive signal in various ways according to register set values. Therefore, before explaining the focus jump operation with reference to FIGS. 6 and 7, the register set values will be explained with reference to FIGS. 8 and 9.

Various register set values shown in FIG. 8 will be explained in association with an example of a focus jump drive signal waveform at the time of focus-up jump shown in FIG. 9. Note that the numbers of bits of the respective registers are as shown in FIG. 8.

FJVKS: Kick Start Voltage

In the case of this embodiment, the kick pulse is set to a waveform in which a kick drive force gradually increases from an initial value. Note that, to increase the kick drive force, the kick pulse is set to a waveform for gradually raising a kick pulse voltage level in the case of focus-up jump and is set to a waveform for gradually lowering a kick pulse voltage level in the case of focus-down jump.

Figure 9:
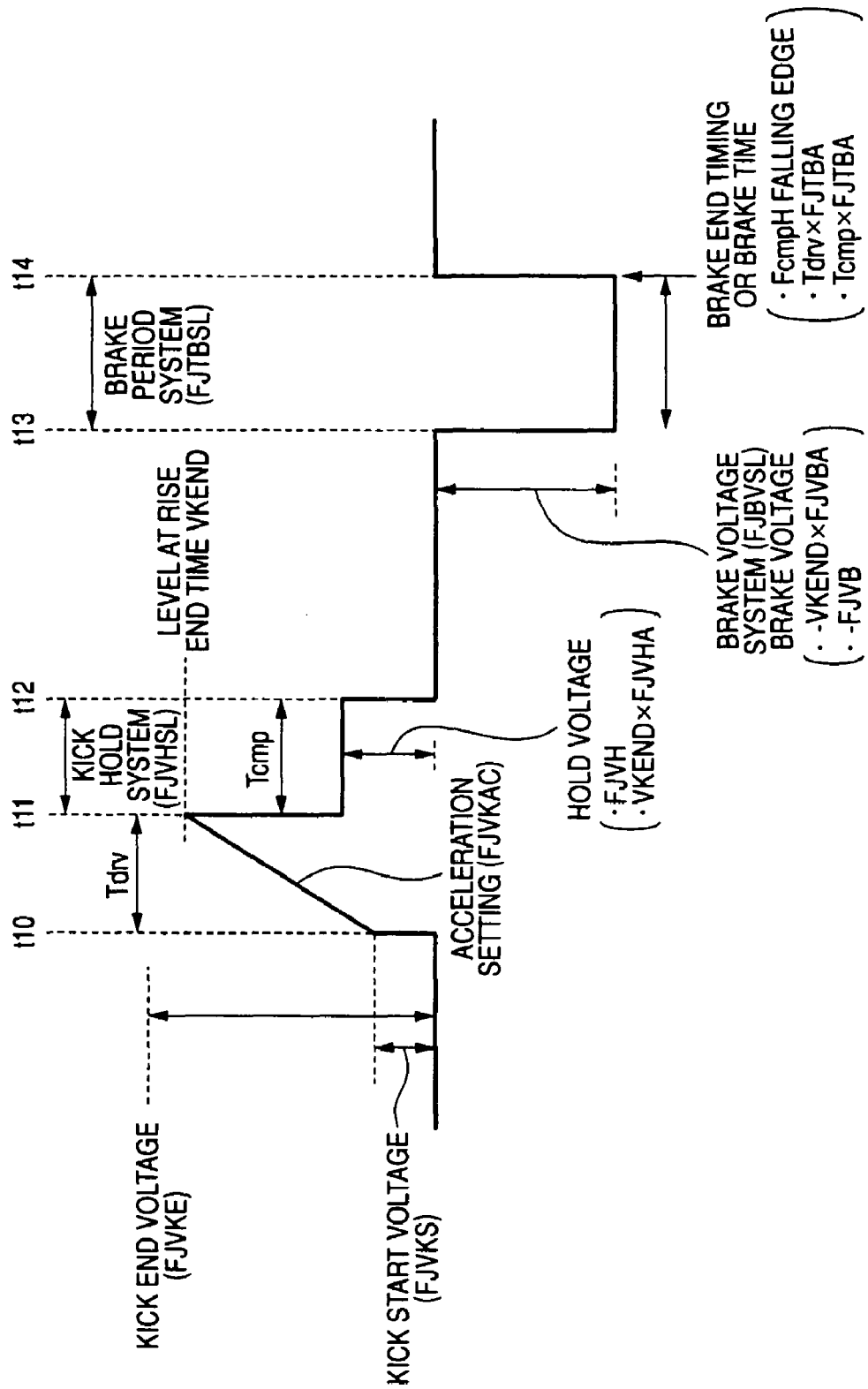
FIG. 9 is a diagram for explaining meaning of the set values of the focus jump in the first embodiment.

This kick start voltage is a set value of a voltage level as an initial value that is given at a point t10 in FIG. 9. It is possible to set the kick start voltage in 256 stages from 0V to a maximum voltage with 8 bits of a register FJVKS.

FJVKE: Kick End Voltage

A kick end voltage is an upper limit value of a voltage given as a kick pulse. It is possible to set the kick end voltage in 256 stages from 0V to a maximum voltage with 8 bits of a register FJVKE.

FJVKAC: Kick Voltage Acceleration

Kick voltage acceleration is acceleration for gradually increasing the kick drive force of the kick pulse as in a period from the point t10 to a point t11 in FIG. 9. In other words, the kick voltage acceleration is a set value of acceleration for raising the kick pulse voltage in the focus-up jump. An inclination of a waveform in gradually raising a voltage is set according to 4 bit set values of a register FJVKAC. Note that, in the case of the focus-down jump, a value of FJVKAC is set to a value of an inclination of a waveform in gradually lowering a voltage.

FJVHSL: Kick Hold System Selection

For example, after raising a voltage of the kick pulse to the point t11, the voltage of the kick pulse is held at a certain voltage level from the point t11 to a point t12. A setting system for a hold voltage is selected according to a 1 bit value of a register FJVHSL. When FJVHSL is 0, the setting system is in a mode for setting a set voltage value as the hold voltage. When FJVHSL is 1, the setting system is in a mode for setting a voltage value, which is calculated according to a ratio to a voltage at the time when the increase in the drive force of the kick pulse ends, that is, a voltage VKEND in FIG. 9, as the hold voltage.

FJVH: Kick Hold Voltage

A kick hold voltage is a set value of a hold voltage in the case of the mode of FJVHSL=0. It is possible to set the hold voltage in 256 stages from 0V to a maximum voltage with 8 bits of a register FJVH.

FJVHA: Kick Hold Voltage Kick Voltage Ratio

A kick hold voltage kick voltage ratio is a set value of a ratio for calculating a hold voltage in the case of the mode of FJVHSL=1. A hold voltage is calculated by multiplying a voltage at the time when the kick pulse voltage rise ends (VKEND) by a ratio set in a register FJVHA. It is possible to set a value of the ratio in 16 stages with 4 bits of the register FJVHA.

FJVBSL: Brake Voltage System Selection

For example, a brake pulse is generated from a point t13. A setting system for a voltage value of the brake pulse in that case is selected according to a 1 bit value of a register FJVBSL. When FJVBSL is 0, the setting system is in a mode for setting a set voltage value as a brake pulse voltage. When FJVBSL is 1, the setting system is in a mode for setting a voltage value, which is calculated according to a ratio to a voltage at the time when the rise of the voltage of the kick pulse ends, as the hold voltage.

FJVB: Brake Voltage

A brake voltage is a set value of a brake pulse voltage in the case of the mode of FJVBSL=0. It is possible to set the brake pulse voltage in 256 stages with 8 bits of a register FJVB.

FJVBA: Brake Voltage Kick Voltage Ratio

A brake voltage kick voltage ratio is a set value of a ratio for calculating a brake pulse voltage in the case of the mode of FJVBSL=1. A brake pulse voltage is calculated by multiplying a voltage at the time when the kick pulse drive force increase ends (VKEND) by a ratio set in a register FJVBA. It is possible to set a value of the ratio in 16 stages with 4 bits of the register FJVBA.

FJFCHS: FcmpH Signal Mask Time

An FcmpH signal mask time is a register in setting a time length of an FcmpH signal mask period shown in (d) in FIG. 6 as a fixed value. It is possible to variably set the FcmpH signal mask time in 8 stages in 11.337 to 90.696 μsec as a mask period for an FcmpH signal.

FJFCH: FcmpH Slice Level

An FcmpH slice level is a set value of an FcmpH slice level shown in FIG. 6A. It is possible to variably set the FcmpH slice level in 128 stages from a center voltage to a maximum voltage according to a 7 bit value of a register FJFCH. The maximum value is a full-bit voltage of the A/D conversion section 21.

FJFCLS: FcmpL Signal Mask Time

An FcmpL signal mask time is a register in setting a time length of an FcmpL signal mask period shown in (d) in FIG. 10 described later as a fixed value. It is possible to variably set the FcmpL signal mask time in 8 stages in 11.337 to 90.696 μsec as a mask period for an FcmpL signal.

FJFCL: FcmpL Slice Level

An FcmpL slice level is a set value of an FcmpL slice level shown in FIG. 6A. It is possible to variably set the FcmpL slice level in 128 stages from 0V to a center voltage according to a 7 bit value of a register FJFCL.

FJMASK: Mask Time Tcmp Time Ratio

Figure 10:
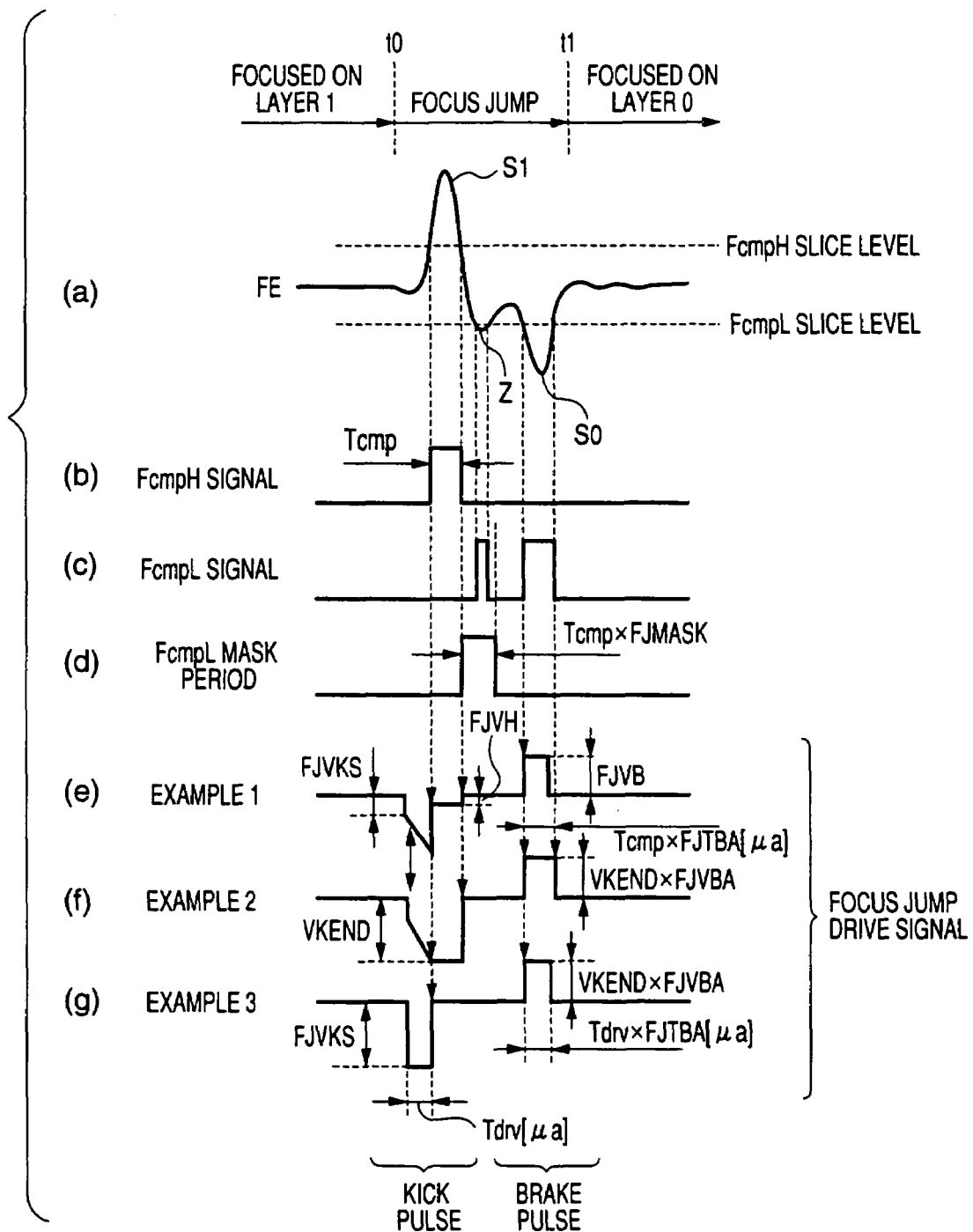
FIG. 10 is a diagram for explaining an operation at the time of focus-down jump in the first embodiment.

A mask time Tcmp time ratio is a set value of a ratio in setting a mask period in (d) in FIG. 6 or (d) in FIG. 10. In the case of (d) in FIG. 6, Tcmp time is H level time of an FcmpL signal. In the case of (d) in FIG. 10, Tcmp time is H level time of an FcmpH signal. It is possible to set a value of the ratio in 32 stages with a 5 bit register FJMASK.

FJTBSL: Brake Period System Selection

A mode of a brake pulse application period, for example, from a point t13 to a point t14 in FIG. 9 is set with a 2 bit value of a register FJTBSL. When FJTBSL is 0 or 1, a brake period system is in a mode for ending a brake pulse in synchronization with a falling edge of an Fcmp signal. Note that the Fcmp signal in this context means an FcmpH signal in the case of the focus-up jump and an FcmpL signal in the case of the focus-down jump. When FJTBSL is 2, the brake period system is in a mode for set application time of a brake pulse as a ratio to a Tdrv period, that is, kick pulse application time. When FJTBSL is 3, the brake period system is a mode for set application time of a brake pulse as a ratio to a Tcmp period.

FJTBA: Brake Time Ratio

A value of a ratio, which is used for calculation of a brake period in the mode of FJTBSL=2 or 3, is set in this register FJTBA. When FJTBSL is 2, a value obtained by multiplying Tdrv time by a value of the register FJTBA is set as brake pulse application time. When FJTBSL is 3, a value obtained by multiplying Tcmp time by a value of the register FJTBA is set as brake pulse application time.

FJSQEND: Sequence End System Selection

Modes for ending a focus jump sequence, that is, modes with different timing for turning on the focus servo are set with a value of 2 bit register FJSQEND. When FJSQEND is 0 or 1, a sequence end system is in a mode for ending the focus jump according to an end of a brake pulse. When FJSQEND is 2, the sequence end system is in a mode for ending the focus jump at falling edge timing of an Fcmp signal. When FJSQEN is 3, the sequence end system is in a mode for ending the focus jump at later one of the brake pulse end timing and the Fcmp signal falling edge timing. Note that, in these modes, again, the Fcmp signal means an FcmpH signal in the case of the focus-up jump and an FcmpL signal in the case of the focus-down jump.

A focus jump drive signal is generated in the focus jump logic 24b on the basis of the register setting described above. In addition to the register setting, measurement values, that is, a voltage at the time of kick pulse drive force increase end VKEND, measurement time Tdrv of a kick pulse drive force increase period, and measurement time Tcmp of a kick pulse hold period may be used for the generation of the focus jump drive signal.

Incidentally, in designing the reproduction apparatus, characteristics of the pickup 3, in particular, an operation characteristic, a friction characteristic, and the like of the biaxial mechanism 3e are measured. Optimum values of the respective registers only have to be set according to the characteristics. In other words, an optimum focus jump drive waveform is set according to the biaxial mechanism 3e mounted in the pickup 3.

The respective set register values are stored in a ROM or a nonvolatile memory in a DSP serving as the servo control section 10 or in a microcomputer serving as the controller 12. The focus jump logic 24b in the servo control section 10 generates a focus jump drive signal with reference to the stored register values.

The focus jump drive signal wave form can be set according to the values of the respective registers. This means that it is possible to optimize the focus jump drive signal waveform for each model of the reproduction apparatus or every time a design of the reproduction apparatus is changed.

Setting for waveforms in (e), (f), and (g) in FIG. 6 will be explained.

A waveform of a focus jump drive signal in (e) in FIG. 6 is set as described below.

A kick voltage acceleration (FJVKAC) is set to a certain value other than 0 and a kick pulse is gradually increased from a kick start voltage (FJVKS) that is an initial value.

A hold voltage is in the mode of the kick hold system selection (FJVHSL)=0 and is set to a set value of a kick hold voltage (FJVH).

A brake voltage is in the mode of the brake voltage system selection (FJVBSL)=0. The brake voltage is set to a set value of the brake voltage (FJVB). However, since the brake voltage is a negative polarity pulse, a voltage value to be outputted has a value of −1×(FJVB).

An application period of a brake pulse is in the mode of the brake period system selection (FJTBSL)=3. The application period depends on a brake time ratio (FJTBA) to Tcmp time.

An end of the focus jump sequence is in the mode of the sequence end system selection (FJSQEND)=2. The focus servo is turned on at falling edge timing of the FcmpH signal.

Therefore, the focus jump drive signal in (e) in FIG. 6 is generated as described below.

When the focus servo is turned off at the point t0 in FIG. 6 to start focus jump, first, a kick start voltage (FJVKS) is generated as a kick pulse. Thereafter, a voltage level is gradually raised in accordance with setting for the kick voltage acceleration (FJVKAC).

A rise of a kick pulse voltage is ended at earlier one of a point when a rising edge of the FcmpL signal, that is, start of movement of the object lens 3a is confirmed and a point when the kick pulse voltage reaches a kick end voltage (FJVKE) that is an upper limit value.

When the voltage rise of the kick pulse is ended, the kick pulse keeps a hold voltage. In this case, a voltage value to be held is a voltage set by the register for the kick hold voltage (FJVH).

A hold voltage output of the kick pulse is ended at falling edge timing of the FcmpL signal.

Thereafter, the focus jump logic 24b stands by for the FcmpH signal mask period in (d) in FIG. 6. When a rising edge of the FcmpH signal is detected after the FcmpH signal mask period is ended, the focus jump logic 24b generates a brake pulse of a voltage (−FJVB) based on a set value of the register for a brake voltage (FJVB).

An application period of the brake pulse is determined by multiplying the Tcmp time, which is a measurement value of the H level time of the FcmpL signal, by the brake time ratio (FJTBA). The brake pulse application is continued in the calculated period. The Tcmp time, which is a measurement value of the H level time of the FcmpL signal, is set to a value corresponding to moving speed of the object lens 3a in jump movement. Therefore, in this case, brake pulse output is performed in the period that is calculated according to moving speed of the object lens 3a.

After generating the focus jump drive signal as the kick pulse and the brake pulse, the focus jump logic 24b turns on the focus servo at falling edge timing of the FcmpH signal and ends the focus jump sequence.

Next, setting for a waveform of a focus jump drive signal in (f) in FIG. 6 will be explained.

The kick voltage acceleration (FJVKAC) is set to a certain value other than 0 and a kick pulse is gradually increased from the kick start voltage (FJVKS) that is an initial value.

A hold voltage is in the mode of the kick hold system selection (FJVHSL)=1 and a voltage value, which is calculated according to a ratio (FJVHA) to the voltage at the kick pulse drive force increase end VKEND, is set as a hold voltage.

A brake voltage is in the mode of the brake voltage system selection (FJVBSL)=1. A voltage value, which is calculated according to a ratio (FJVBA) to the voltage at the kick pulse drive force increase end VKEND, is set as a brake pulse voltage. Since the brake voltage is a negative polarity pulse, the voltage value is set to −1×VKEND×FJVBA.

An application time of a brake pulse is in the mode of the brake period system selection (FJTBSL)=0 (or 1). The brake pulse application is ended at falling edge timing of the FcmpH signal.

An end of the focus jump sequence is in the mode of the sequence end system selection (FJSQEND)=2. The focus servo is turned on at falling edge timing of the FcmpH signal.

Therefore, a focus jump drive signal in (f) in FIG. 6 is generated as described below.

When the focus servo is turned off at the point t0 to start the focus jump, first, the kick start voltage (FJVKS) is generated as a kick pulse. Thereafter, a voltage level is raised gradually in accordance with the setting of the kick voltage acceleration (FJVKAC).

A rise of a kick pulse voltage is ended at earlier one of the rising edge of the FcmpL signal, that is, a point when start of movement of the object lens 3a is confirmed and a point when the kick pulse voltage reaches the kick end voltage (FJVKE) that is an upper limit value.

When the kick pulse voltage rise is ended, the kick pulse keeps a hold voltage. In this case, a voltage value to be held is determined by multiplying the voltage at the time of a kick pulse voltage rise end VKEND by the ratio (FJVHA). For example, when it is assumed that the ratio (FJVHA) is set to 1, as shown in the figure, the voltage VKEND is held as it is.

The hold voltage output of the kick pulse is ended at falling edge timing of the FcmpL signal.

Thereafter, the focus jump logic 24b stands by for the FcmpH signal mask period in (d) in FIG. 6. When a rising edge of the FcmpH signal is detected after the FcmpH signal mask period is ended, the focus jump logic 24b generates a brake pulse as a voltage value obtained by multiplying the voltage VKEND by the ratio (FJVBA) and −1.

The brake pulse is generated until a rising edge of the FcmpH signal is detected. Then, the focus jump logic 24b ends the brake pulse at falling edge timing of the FcmpH signal and turns on the focus servo to end the focus jump sequence.

Next, setting for a waveform of a focus jump drive signal in (g) in FIG. 6 will be explained.

The kick voltage acceleration (FJVKAC) is set to 0. Therefor, the operation for gradually raising a kick pulse is not performed.

A hold voltage is in the mode of the kick hold system selection (FJVHSL)=0. The hold voltage is set to a set value of the kick hold voltage (FJVH). The kick hold voltage (FJVH) is set to 0.

A brake voltage is in the mode of the brake voltage system selection (FJVBSL)=1. A voltage value calculated according to the ratio (FJVBA) to the voltage at the time of the kick pulse voltage rise VKEND is set to a brake pulse voltage (−1×VKEND×FJVBA).

An application period of the brake pulse is in the mode of the brake period system selection (FJTBSL)=2. The application period is determined according to the brake time ratio (FJTBA) to the Tdrv time.

The end of the focus jump sequence is in the mode of the sequence end system selection (FJSQEND)=2. The servo focus is turned on at falling edge timing of the FcmpH signal.

Therefore, the focus jump drive signal in (g) in FIG. 6 is generated as described below.

When the focus servo is turned off at the point t0 to start the focus jump, first, the kick start voltage (FJVKS) is generated as a kick pulse. In this case, the kick start voltage (FJVKS) is set to a relatively high voltage value and the kick voltage acceleration (FJVKAC) is 0. Thus, the kick start voltage (FJVKS) is maintained as it is.

The kick pulse is ended at a point when a rising edge of the FcmpL signal, that is, start of movement of the object lens 3a is confirmed. In this case, since the kick hold voltage (FJVH) is set to 0, the kick pulse is ended at this point.

Thereafter, the focus jump logic 24b stands by for in the FcmpH signal mask period in (d) in FIG. 6. When a rising edge of the FcmpH signal is detected after the FcmpH signal mask period is ended, the focus jump logic 24b generates a brake pulse as a voltage value obtained by multiplying the voltage VKEND by the ratio (FJVBA).

An application period of the brake pulse is determined by multiplying the Tdrv time, which is a measurement value of the kick pulse application time, by the brake time ratio (FJTBA) The brake pulse application is continued in the calculated period. In the case of this embodiment, the Tdrv time, which is a measurement value of the kick pulse application time, is a value corresponding to moving speed of the object lens 3a at the time of jump movement. Therefore, in this case, brake pulse output is performed in a period that is calculated according to the moving speed of the object lens 3a.

After generating the focus jump drive signal as the kick pulse and the brake pulse, the focus jump logic 24b turns on the focus servo at falling edge timing of the FcmpL signal and ends the focus jump sequence.

FIG. 7 shows a focus-up jump sequence that the focus jump logic 24b executes in order to generate, for example, the focus jump drive signals as indicated by (e), (f), and (g) in FIG. 6.

A focus-up jump sequence from the layer 0 to the layer 1 is started, first, in step F101, the focus jump logic 24b generates a kick pulse for moving the object lens 3a in a direction of the layer 1. A voltage value at this point is set to a set voltage value of the kick start voltage (FJVKS).

Subsequently, in step F102, the focus jump logic 24b increases a kick drive force at acceleration set by the kick voltage acceleration (FJVKAC) until a rising edge of the FcmpL signal is detected or a voltage value reaches an upper limit value (the kick end voltage (FJVKE)) while a rising edge of the FcmpL signal is not detected. In other words, the focus jump logic 24b raises a kick voltage. Note that it is also possible that the kick voltage acceleration (FJVKAC) is set to 0 and the kick drive force is not increased.

In addition, a voltage value at a point when the kick pulse drive force rise is ended is held as the voltage VKEND.

In step F103, the focus jump logic 24b confirms a setting for the kick hold system (FJVHSL) and branches the processing. When a hold voltage is set to a set value as the kick hold system (FJVHSL=0), the focus jump logic 24b proceeds to step F105 and holds the kick pulse at a set voltage of the kick hold voltage (FJVH).

When a hold voltage is set according to the ratio to the voltage VKEND (FJVHA) as the kick hold system (FJVHSL=1), the focus jump logic 24b proceeds to step F104, calculates a hold voltage according to voltage VKEND×ratio (FJVHA), and holds the kick pulse at the voltage.

In step S106, the focus jump logic 24b stands by for falling edge timing of the FcmpL signal and, when a falling edge is detected, ends the kick pulse.

Note that, if measurement of the H level time Tcmp of the FcmpL signal is started from a point when a rising edge of the FcmpL signal is detected in step F102 or the like and a falling edge of the FcmpL signal is detected in step F106, the focus jump logic 24b ends the measurement of the H level time Tcmp at the point.

Subsequently, in step F107, the focus jump logic 24b sets the FcmpH signal mask period in (d) in FIG. 6. For example, the focus jump logic 24b multiplies the time Tcmp by a value of the mask time Tcmp time ratio (FJMASK) to obtain mask time in which the FcmpH signal is not monitored. Then, the focus jump logic 24b does not monitor the FcmpH signal until the FcmpH signal mask period elapses.

In step F108, the focus jump logic 24b confirms a setting for the brake voltage system selection (FJVBSL).

When a brake pulse voltage is set to a set value as the brake voltage system (FJVHSL=0), the focus jump logic 24b proceeds to step F110. Then, from a point when a rising edge of the FcmpH signal is detected, the focus jump logic 24b generates a brake pulse at a set voltage of the brake voltage (FJVB). However, since the brake pulse is a brake voltage for decelerating movement of the object lens 3a, the brake pulse has a voltage of a polarity opposite to that of the kick pulse. In this case, since the brake pulse has a negative polarity, the brake pulse is a voltage of FJVB×(−1).

When a brake voltage is set according to the ratio to the voltage VKEND (FJVBA) as the brake voltage system (FJVBSL=1), the focus jump logic 24b proceeds to step F109. Then, the focus jump logic 24b calculates a brake voltage according to −1×voltage VKEND×ratio (FJVBA) and generates a brake pulse of the calculated voltage from the point when the rising edge of the FcmpH signal is detected.

In step F111, the focus jump logic 24b confirms a setting for the brake period system selection (FJTBSL).

When a mode for setting a falling edge of the FcmpH signal as brake pulse end timing (FJTBSL=0 or 1) is adopted as the brake period system, the focus jump logic 24b proceeds to F112. Then, the focus jump logic 24b continues the brake pulse output until a falling edge of the FcmpH signal is detected.

When a mode for setting a brake pulse application period according to the ratio to the time Tdrv (FJTBA) (FJTBSL=2) is adopted as the brake period system, the focus jump logic 24b proceeds to step F113. Then, the focus jump logic 24b multiplies the time Tdrv by the ratio (FJTBA) to calculate a brake pulse application period. The focus jump logic 24b continues the brake pulse output in the period. Note that, in the case of this mode, for example, measurement of the time Tdrv is required to be performed at the stage of step F102.

When a mode for setting a brake pulse application time according to the ratio to the time Tcmp (FJTBA) (FJTBSL=3) is adopted as the brake period system, the focus jump logic 24b proceeds to step F114. Then, the focus jump logic 24b multiplies the time Tcmp by the ratio (FJTBA) to calculate a brake pulse application period. The focus jump logic 24b continues the brake pulse output in the period.

In step F115, the focus jump logic 24b confirms a setting for the sequence end system selection (FJSQEND).

When a mode for setting brake pulse end timing as sequence end timing (FJSQEND=0 or 1) is adopted as the sequence end system, the focus jump logic 24b proceeds to step F116. Then, at a point when the output of the brake pulse is ended, the focus jump logic 24b turns on the focus servo and ends the focus jump sequence.

When a mode for setting falling edge timing of the FcmpH signal as sequence end timing (FJSQEND=2) is adopted as the sequence end system, the focus jump logic 24b proceeds to step F117. Then, at a point when a falling edge of the FcmpH signal is detected, the focus jump logic 24b turns on the focus servo and ends the focus jump sequence.

When a mode for setting later one of brake pulse end timing and falling edge timing of the FcmpH signal as sequence end timing (FJSQEND=3) is adopted as the sequence end system, the focus jump logic 24b proceeds to step S118. Then, at a point when both an end of the output of the brake pulse and a falling edge of the FcmpH signal are detected, the focus jump logic 24b turns on the focus servo and ends the focus jump sequence.

After the register setting in FIG. 8 is performed, the focus jump logic 24b executes the focus jump sequence in FIG. 7, whereby, for example, the focus jump drive signals like (e), (f), and (g) in FIG. 6 are generated and the focus-up jump from the layer 0 to the layer 1 is executed.

[1-5: Focus-Down Jump Operation]

Subsequently, a focus-down jump operation for shifting from the layer 1 to the layer 0 will be described with reference to FIGS. 10 and 11.

(a) in FIG. 10 shows a focus error signal FE observed at the time of the focus-up jump that is started by giving a kick pulse from the point t0.

As in (b) and (c) in FIG. 6, (b) and (c) in FIG. 10 shows an FcmpH signal and an FcmpL signal that are obtained by performing processing for comparing the FcmpH slice level and the FcmpL slice level with the focus error signal FE in the comparator 22 and 23.

When the focus jump is performed from the layer 1 to the layer 0, the focus error signal FE with a polarity opposite to that in the case of FIG. 6 is observed. In other words, a waveform in (a) in FIG. 10 has a time axis direction opposite to that of the waveform in (a) in FIG. 6.

Since the object lens 3a is driven in an opposite direction, that is, a down direction, in the focus jump drive signals in (e), (f), and (g) in FIG. 10, a kick pulse is set to a negative polarity pulse and a brake pulse is set to a positive polarity pulse. Therefore, opposite to the case of the focus-up jump described above, a fall of a kick pulse voltage corresponds to a rise of a kick drive force.

For example, at the point t0, the focus servo is turned off, kick pulses of a negative polarity like examples shown in (e), (f), and (g) in FIG. 10 are generated as focus jump drive signals, and an electric current corresponding to the kick pulses is fed to the focus coil of the biaxial mechanism 3e, whereby the object lens 3a starts movement downward. Therefore, as the focus error signal FE, a waveform S1, which is a half of the S waveform, near a focus point of the layer 1 is observed after the point t0.

When the object lens 3a moves in that state, as the focus error signal FE, the quasi waveform Z may be generated because of, for example, influence of irregular reflection of an interlayer film. However, a waveform S0, which is a former half of the S waveform, is observed near a focus point of the layer 0. Therefore, it is possible to draw focus into the layer 0 if the focus servo is turned on near zero cross timing of the S waveform S0.

In this focus jump operation, after the kick pulse is given at the point t0, if the FcmpH signal rises according to the S waveform S of the focus error signal FE, it is possible to confirm that the movement of the object lens 3a is started.

Thereafter, the object lens 3a continues to move. However, if the FcmpL signal rises according to the S waveform S0 of the focus error signal FE, it is possible to confirm that the object lens 3a has reached near the focus point of the layer 0. Therefore, when a brake pulse is given as the focus jump drive signal at that timing, the movement of the object lens 3a is decelerated. For example, the focus servo is turned on at falling edge timing of the FcmpL signal, whereby the focus jump is completed.

Note that, in this case, the FcmpL signal may rise before the S waveform S0 according to the quasi waveform Z. Therefore, the FcmpL mask period in (d) in FIG. 10 is set for a required period from the falling edge of the FcmpH signal such that a rising edge of the FcmpL signal according to the quasi waveform Z is not detected.

In FIG. 10, examples of the focus jump drive signals generated by the focus jump logic 24b are shown as (e), (f), and (g). As in the case of the focus-up jump described above, these focus jump drive signals are generated by the focus jump logic 24b in sequence processing using the FcmpH signal, the FcmpL signal, and set values of the various registers.

A waveform of the focus jump drive signal in (e) in FIG. 10 is according to settings described below.

The kick voltage acceleration (FJVKAC) is set to a certain value other than 0 and a kick drive force according to a kick pulse is gradually increased from the kick start voltage (FJVKS) that is an initial value. In this case, the kick drive force is increased by raising a voltage value in a negative direction (i.e., lowering a voltage). Thus, the kick start voltage is a value obtained by multiplying a value of the register (FJVKS) by −1. The kick voltage acceleration is acceleration in a negative direction.

A hold voltage is in the mode of the kick hold system selection (FJVHSL)=0. The hold voltage is set to a set value of the kick hold voltage (FJVH) (kick hold voltage=−1× (FJVH).

A brake voltage is in the mode of the brake voltage system selection (FJVBSL)=0. The brake voltage is set to a set value of the brake voltage (FJVB).

An application period of the brake pulse is in the mode of the brake period system selection (FJTBSL)=3. The application period depends on the brake time ratio (FJTBA) to the Tcmp time.

An end of the focus jump sequence is in the mode of the sequence end system selection (FJSQEND)=2. The focus servo is turned on at falling edge timing of the FcmpH signal.

Therefore, the focus jump drive signal in (e) in FIG. 10 is generated as described below.

When the focus servo is turned off at the point t0 in FIG. 10 to start the focus jump, first, the kick start voltage (−1× FJVKS) is generated as the kick pulse. Thereafter, the kick drive force is gradually increased in accordance with the setting for the kick voltage acceleration (FJVKAC). In this case, the voltage value is gradually lowered in the negative direction.

The fall of the kick pulse voltage for the increase in the kick drive force is ended at earlier one of a point when a rising edge of the FcmpH signal, that is, start of movement of the object lens 3a is confirmed and a point when the kick pulse voltage reaches the kick end voltage (FJVKE). Note that, in this case, naturally, a voltage of register (FJVKE)×(−1) is an upper limit of the kick drive force (=voltage lower limit value).

When the increase in the kick pulse drive force, that is, the fall of the kick pulse voltage is ended, the kick pulse keeps the hold voltage. In this case, a voltage value to be held is the voltage (−1×FJVH) set by the kick hold voltage (FJVH).

The output of the hold voltage of the kick pulse is ended at falling edge timing of the FcmpH signal.

Thereafter, the focus jump logic 24b stands by for the FcmpL signal mask period in (d) in FIG. 10. After the FcmpL signal mask period is ended, if a rising edge of the FcmpL signal is detected, the focus jump logic 24b generates a brake pulse of a set value voltage of the brake voltage (FJVB).

An application period of the brake pulse is determined by multiplying the Tcmp time, which is a measurement value of the H level time of the FcmpH signal, by the brake time ratio (FJTBA). The brake pulse application is continued for the calculated period. The Tcmp time, which is the measurement value of the H level time of the FcmpH signal, is a value corresponding to moving speed of the object lens 3a at the time of jump movement. Therefore, in this case, the focus jump logic 24b outputs the brake pulse for a period calculated according to the moving speed of the object lens 3a.

After generating the focus jump drive signals as the kick pulse and the brake pulse, the focus jump logic 24b turns on the focus servo at falling edge timing of the FcmpL signal to end the focus jump sequence.

Next, setting for a waveform of the focus jump drive signal in (f) in FIG. 10 will be explained.

The kick voltage acceleration (FJVKAC) is set to a certain value other than 0 and a kick drive force according to a kick pulse is gradually increased from the kick start voltage (−1× FJVKS) that is an initial value. A voltage value is gradually lowered.

A hold voltage is in the mode of the kick hold system selection (FJVHSL)=1. A voltage value calculated according to the ratio to the voltage at the kick pulse drive force rise end VKEND (FJVHA) is set as the hold voltage.

A brake voltage is in the mode of the brake voltage system selection (FJVBSL)=1. A voltage value calculated according to the ratio to the voltage at the time of the kick pulse drive force rise end VKEND (FJVBA) is set as the brake pulse voltage. Since the brake pulse and the kick pulse have opposite polarities, brake pulse voltage=−1×VKEND×FJVBA.

An application period of the brake pulse is in the mode of the brake period system selection (FJTBSL)=0 (or 1). The brake pulse application is ended at falling edge timing of the FcmpL signal.

The end of the focus jump sequence is in the mode of the sequence end system selection (FJSQEND)=2. The focus servo is turned on at falling edge timing of the FcmpL signal.

Therefore, the focus jump drive signal in (f) in FIG. 10 is generated as described below.

When the focus servo is turned off at the point t0 to start the focus jump, first, the kick start voltage (−1×FJVKS) is generated as the kick pulse. Thereafter, a voltage value is gradually lowered in accordance with a setting for the kick voltage acceleration (FJVKAC), whereby the kick drive force is increased.

The increase in the drive force by the kick pulse is ended at earlier one of a point when a rising edge of the FcmpH signal, that is, start of movement of the object lens 3a and a point when the kick pulse voltage reaches the kick end voltage (−1×FJVKE).

When the kick pulse voltage rise is ended, the kick pulse keeps a hold voltage. In this case, a voltage value to be held is determined by multiplying the voltage at the time of a kick pulse voltage rise end VKEND by the ratio (FJVHA). For example, when it is assumed that the ratio (FJVHA) is set to 1, as shown in the figure, the voltage VKEND is held as it is.

The hold voltage output of the kick pulse is ended at falling edge timing of the FcmpH signal.

Thereafter, the focus jump logic 24b stands by for the FcmpL signal mask period in (d) in FIG. 10. When a rising edge of the FcmpL signal is detected after the FcmpL signal mask period is ended, the focus jump logic 24b generates a brake pulse as a voltage value obtained by multiplying the voltage VKEND by the ratio (FJVBA) and −1.

The brake pulse is generated until a rising edge of the FcmpL signal is detected. Then, the focus jump logic 24b ends the brake pulse at falling edge timing of the FcmpL signal and turns on the focus servo to end the focus jump sequence.

Next, setting for a waveform of a focus jump drive signal in (g) in FIG. 10 will be explained.

The kick voltage acceleration (FJVKAC) is set to 0. Therefor, the operation for gradually raising a kick pulse is not performed.

A hold voltage is in the mode of the kick hold system selection (FJVHSL)=0. The hold voltage is set to a set value of the kick hold voltage (FJVH). The kick hold voltage (FJVH) is set to 0.

A brake voltage is in the mode of the brake voltage system selection (FJVBSL)=1. A voltage value calculated according to the ratio (FJVBA) to the voltage at the time of the kick pulse voltage rise VKEND is set to a brake pulse voltage (−1× VKEND×FJVBA).

An application period of the brake pulse is in the mode of the brake period system selection (FJTBSL)=2. The application period is determined according to the brake time ratio (FJTBA) to the Tdrv time.

The end of the focus jump sequence is in the mode of the sequence end system selection (FJSQEND)=2. The servo focus is turned on at falling edge timing of the FcmpL signal.

Therefore, the focus jump drive signal in (g) in FIG. 10 is generated as described below.

When the focus servo is turned off at the point t0 to start the focus jump, first, the kick start voltage (−1×FJVKS) is generated as a kick pulse. In this case, a set value of the kick start voltage, that is, a value of the register FJVKS is set to a relatively high voltage value and the kick voltage acceleration (FJVKAC) is 0. Thus, the kick start voltage (−1×FJVKS) is maintained as it is.

The kick pulse is ended at a point when a rising edge of the FcmpH signal, that is, start of movement of the object lens 3a is confirmed. In this case, since the kick hold voltage (FJVH) is set to 0, the kick pulse is ended at this point.

Thereafter, the focus jump logic 24b stands by for in the FcmpL signal mask period in (d) in FIG. 10. When a rising edge of the FcmpL signal is detected after the FcmpL signal mask period is ended, the focus jump logic 24b generates a brake pulse as a voltage value obtained by multiplying the voltage VKEND by the ratio (FJVBA) and −1.

An application period of the brake pulse is determined by multiplying the Tdrv time, which is a measurement value of the kick pulse application time, by the brake time ratio (FJTBA) The brake pulse application is continued in the calculated period. In the case of this embodiment, the Tdrv time, which is a measurement value of the kick pulse application time, is a value corresponding to moving speed of the object lens 3a at the time of jump movement. Therefore, in this case, brake pulse output is performed in a period that is calculated according to the moving speed of the object lens 3a.

After generating the focus jump drive signal as the kick pulse and the brake pulse, the focus jump logic 24b turns on the focus servo at falling edge timing of the FcmpL signal and ends the focus jump sequence.

Figure 11:
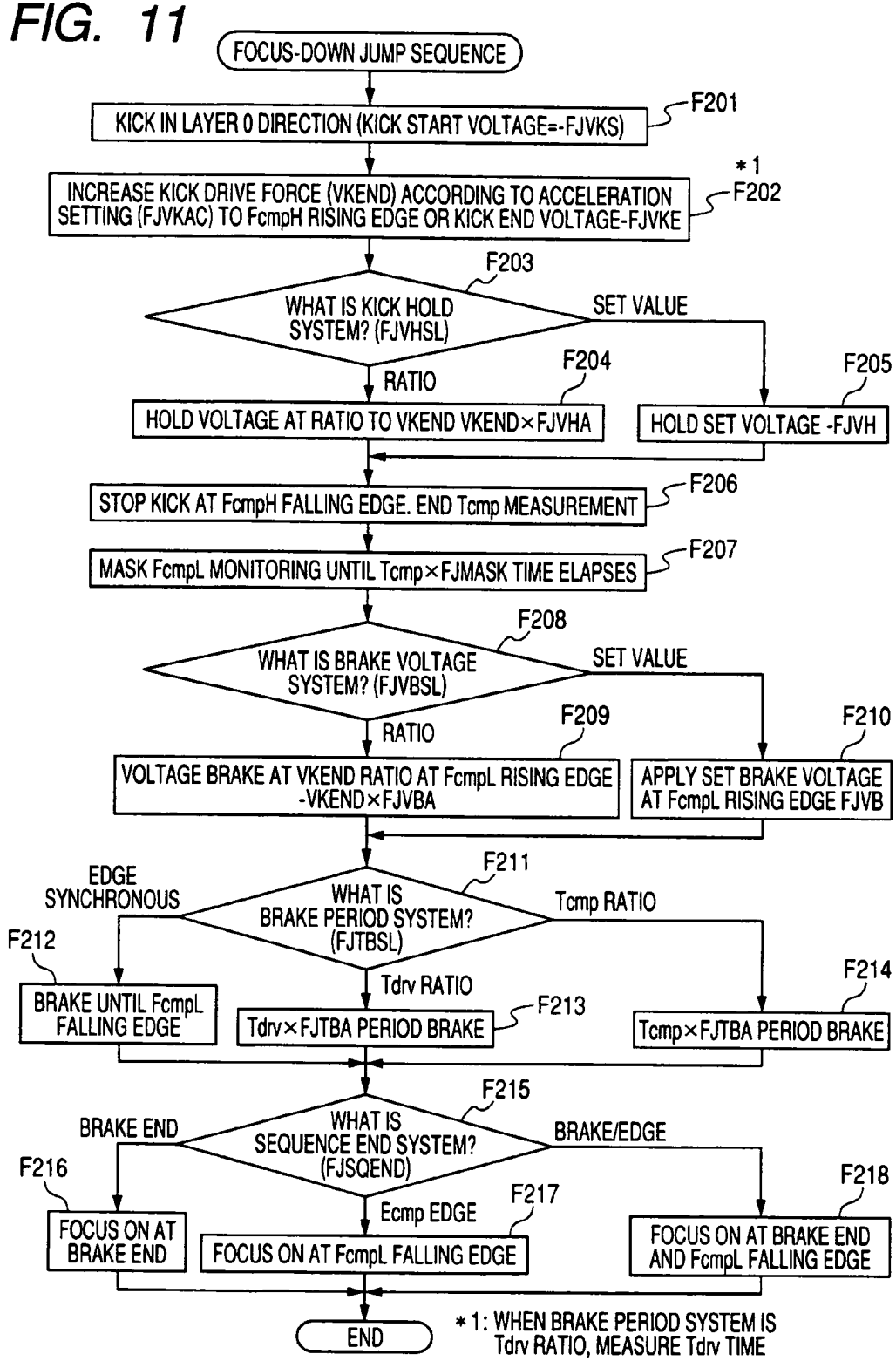
FIG. 11 is a flowchart of focus-down jump processing in the first embodiment.

FIG. 11 shows a focus-down jump sequence that the focus jump logic 24b executes in order to generate, for example, the focus jump drive signals as indicated by (e), (f), and (g) in FIG. 10.

A focus-down jump sequence from the layer 1 to the layer 0 is started, first, in step F201, the focus jump logic 24b generates a kick pulse for moving the object lens 3a in a direction of the layer 0. A voltage value at this point is set to a voltage value obtained by multiplying a set value of the kick start voltage (FJVKS) by −1.

Subsequently, in step F202, the focus jump logic 24*b* increases a kick drive force at acceleration set by the kick voltage acceleration (FJVKAC) until a rising edge of the FcmpH signal is detected or a voltage value reaches a drive force upper limit value (the kick end voltage (−1×FJVKE)) while a rising edge of the FcmpH signal is not detected. In other words, the focus jump logic 24*b* lowers a kick voltage. Note that it is also possible that the kick voltage acceleration (FJVKAC) is set to 0 and the drive force is not increased.

In addition, a voltage value at a point when the kick pulse drive force rise is ended is held as the voltage VKEND.

In step F203, the focus jump logic 24*b* confirms a setting for the kick hold system (FJVHSL) and branches the processing. When a hold voltage is set to a set value as the kick hold system (FJVHSL=0), the focus jump logic 24*b* proceeds to step F205 and holds the kick pulse at a set voltage of the kick hold voltage (FJVH)×(−1).

When a hold voltage is set according to the ratio to the voltage VKEND (FJVHA) as the kick hold system (FJVHSL=1), the focus jump logic 24*b* proceeds to step F204, calculates a hold voltage according to voltage VKEND×ratio (FJVHA), and holds the kick pulse at the voltage.

In step S206, the focus jump logic 24*b* stands by for falling edge timing of the FcmpH signal and, when a falling edge is detected, ends the kick pulse.

Note that, if measurement of the H level time Tcmp of the FcmpH signal is started from a point when a rising edge of the FcmpH signal is detected in step F202 or the like and a falling edge of the FcmpH signal is detected in step F206, the focus jump logic 24*b* ends the measurement of the H level time Tcmp at the point.

Subsequently, in step F207, the focus jump logic 24*b* sets the FcmpL mask period in (d) in FIG. 10. For example, the focus jump logic 24*b* multiplies the time Tcmp by a value of the mask time Tcmp time ratio (FJMASK) to obtain mask time in which the FcmpL signal is not monitored. Then, the focus jump logic 24*b* does not monitor the FcmpL signal until the FcmpL signal mask period elapses.

In step F208, the focus jump logic 24*b* confirms a setting for the brake voltage system selection (FJVBSL).

When a brake pulse voltage is set to a set value as the brake voltage system (FJVHSL=0), the focus jump logic 24*b* proceeds to step F210. Then, from a point when a rising edge of the FcmpL signal is detected, the focus jump logic 24*b* generates a brake pulse at a set voltage of the brake voltage (FJVB). In this case, since the kick voltage has a negative polarity, the brake voltage has a positive polarity and the brake voltage is FJVB.

When a brake voltage is set according to the ratio to the voltage VKEND (FJVBA) as the brake voltage system (FJVBSL=1), the focus jump logic 24*b* proceeds to step F209. Then, the focus jump logic 24*b* calculates a brake voltage according to −1×voltage VKEND×ratio (FJVBA) and generates a brake pulse of the calculated voltage from the point when the rising edge of the FcmpL signal is detected.

In step F211, the focus jump logic 24*b* confirms a setting for the brake period system selection (FJTBSL).

When a mode for setting a falling edge of the FcmpL signal as brake pulse end timing (FJTBSL=0 or 1) is adopted as the brake period system, the focus jump logic 24*b* proceeds to F212. Then, the focus jump logic 24*b* continues the brake pulse output until a falling edge of the FcmpL signal is detected.

When a mode for setting a brake pulse application period according to the ratio to the time Tdrv (FJTBA) (FJTBSL=2) is adopted as the brake period system, the focus jump logic 24*b* proceeds to step F213. Then, the focus jump logic 24*b* multiplies the time Tdrv by the ratio (FJTBA) to calculate a brake pulse application period. The focus jump logic 24*b* continues the brake pulse output in the period. Note that, in the case of this mode, for example, measurement of the time Tdrv is required to be performed at the stage of step F202.

When a mode for setting a brake pulse application time according to the ratio to the time Tcmp (FJTBA) (FJTBSL=3) is adopted as the brake period system, the focus jump logic 24*b* proceeds to step F214. Then, the focus jump logic 24*b* multiplies the time Tcmp by the ratio (FJTBA) to calculate a brake pulse application period. The focus jump logic 24*b* continues the brake pulse output in the period.

In step F215, the focus jump logic 24*b* confirms a setting for the sequence end system selection (FJSQEND).

When a mode for setting brake pulse end timing as sequence end timing (FJSQEND=0 or 1) is adopted as the sequence end system, the focus jump logic 24*b* proceeds to step F216. Then, at a point when the output of the brake pulse is ended, the focus jump logic 24*b* turns on the focus servo and ends the focus jump sequence.

When a mode for setting falling edge timing of the FcmpL signal as sequence end timing (FJSQEND=2) is adopted as the sequence end system, the focus jump logic 24*b* proceeds to step F217. Then, at a point when a falling edge of the FcmpL signal is detected, the focus jump logic 24*b* turns on the focus servo and ends the focus jump sequence.

When a mode for setting later one of brake pulse end timing and falling edge timing of the FcmpL signal as sequence end timing (FJSQEND=3) is adopted as the sequence end system, the focus jump logic 24*b* proceeds to step S218. Then, at a point when both an end of the output of the brake pulse and a falling edge of the FcmpL signal are detected, the focus jump logic 24*b* turns on the focus servo and ends the focus jump sequence.

After the register setting in FIG. 8 is performed, the focus jump logic 24*b* executes the focus jump sequence in FIG. 11, whereby, for example, the focus jump drive signals like (e), (f), and (g) in FIG. 10 are generated and the focus-down jump from the layer 1 to the layer 0 is executed.

[1-6: Advantages and Modifications of the First Embodiment]

The focus jump system in the first embodiment has been explained. Advantages as described below are obtained by the focus jump operation described above.

Acceleration for increasing a drive force is set to the register FJVKAC and kick start voltage is set to an appropriate level according to the register FJVKS. Thus, a kick pulse for starting focus jump movement of the object lens 3*a* increases a kick drive force thereof gradually from a certain initial value (the kick start voltage FJVKS).

Then, movement of the object lens 3*a* is started at a point when a kick voltage reaches a certain kick voltage level corresponding to static friction at that time. In other words, movement of the object lens 3*a* is started while a kick voltage of an optimum level corresponding to a coefficient of static friction at that time is searched. Therefore, start of movement of the object lens 3*a* is guaranteed at a kick pulse level corresponding to the coefficient of static friction at that time.

Since an upper limit of the increase in the kick pulse drive force is set by the register (FJVKE), the kick pulse drive force never becomes excessive to hinder operation stability.

Basically, the increase in the kick pulse drive force is ended according to confirmation of start of focus jump movement, that is, the riding edge of the FcmpL signal in FIG. 6 or the riding edge of the FcmpH signal in FIG. 10. Thus, the increase in the kick pulse drive force is made appropriate as an operation for guaranteeing the start of movement of the object lens 3a.

After the start of movement of the object lens 3a, a coefficient of dynamic friction affects the movement. However, the coefficient of dynamic friction is small compared with the coefficient of static friction. In addition, since the kick drive force until the start of movement is gradually increased, the start of movement is guaranteed. Thus, after the start of movement, it is possible to obtain an appropriate kick pulse by holding the kick pulse level at a fixed level set by the register FJVH.

Considering the fact that factors of fluctuation in the coefficient of dynamic friction is the same as those of the coefficient of static friction, after the object lens 3a starts to move, if the kick pulse is held at a level obtained according to the ratio to the level at the time of kick drive force rise end VKEND (FJVHA) it is possible to obtain a kick pulse of a more appropriate level corresponding to dynamic friction at that time.

Since the start of movement of the object lens 3a by the kick pulse is guaranteed as described above, a stable brake operation is realized by generating a brake pulse at the set level (FJVB).

On the other hand, if a brake pulse of a level obtained according to the ratio to the level at the time of kick drive force rise end VKEND (FJVBA) is generated, it is possible to perform optimum brake control corresponding to friction at that time.

In addition, it is possible to perform optimum brake control by giving a brake signal for a period that is calculated from the time value Tcmp or Tdrv measured during a kick signal application period. For example, the optimum brake control is possible when a brake period is set to time Tdrv×FJTBA or time Tcmp×FJTBA. This is because the time Tcmp represents moving speed of the focus actuator and the time Tdrv represents time until start of movement of the focus actuator or, in the examples in (g) in FIG. 6 and (g) in FIG. 10, represents moving speed. By setting a brake period on the basis of the time Tcmp or the time Tdrv, a brake period corresponding to moving peed or a coefficient of friction is obtained.

Consequently, even when the shaft sliding type focus actuator (the biaxial mechanism 3e) is used, it is possible to realize stable and accurate focus jump and improve apparatus performance regardless of influence of fluctuation in a friction, that is, an individual difference, a recording medium, environmental temperature, a state of use and a posture of the apparatus, and other various factors.

Waveforms and levels of the kick pulse and the brake pulse as the focus jump drive signals can be adjusted finely according to register settings. Thus, it is possible to generate a more appropriate focus jump drive signal according to adjustment corresponding to each reproduction apparatus (biaxial mechanism 3e).

Depending on a register setting, it is also possible to generate a pulse as in the system in the past, which does not gradually increase a drive force, like the kick pulses in (g) in FIG. 6 and (g) in FIG. 10. It is needless to mention that it is possible to output various waveforms of kick pulses and brake pulses not explained as examples according to register settings. This means that the servo control section 10 and the focus jump sequence in this embodiment are generally applicable to various apparatuses and contribute to improvement of productivity.

Incidentally, basically, the focus jump sequence, that is, the processing for gradually increasing a kick pulse drive force only has to be performed every time when focus jump is performed. However, it is also possible that the focus jump sequence is not performed every time when focus jump is performed as described below.

An operation for gradually increasing a drive force at the time of first focus jump, for example, after mounting a disk or after turning on a power supply. A voltage level at start of movement, that is, a value of the voltage VKEND is stored at that time. From the focus jump in the next time, a kick pulse is generated with the voltage VKEND as an initial value.

It is also conceivable that, every time the focus jump is performed, a value of the voltage VKEND serving as a start voltage of the object lens 3a is stored to calculate an average value, a moving average value, or the like of cumulative voltages VKEND and the value is used in stead of the initial value (the kick start voltage FJVKS).

Second Embodiment

[2-1: Focus Jump Drive Signal Setting]

A second embodiment of the invention will be explained. A basic idea of the second embodiment is the same as the first embodiment. In the second embodiment, focus jump drive signals based on register settings can be set in more various ways to further increase flexibility in a focus jump operation. In other words, the focus jump logic according to the first embodiment as well as the DSP as the servo control section 10 can be adopted in more various apparatuses.

First, here, respective register values for setting a focus jump drive signal will be explained.

FIG. 14 shows the respective register values. Note that, in FIG. 14, registers provided anew and registers with settings different from those in FIG. 8 are marked with *. The registers not marked with * are the same as those in FIG. 8.

First, only the registers marked with * in FIG. 14 will be explained. Then, focus jump drive signal waveforms, which are generated on the basis of the register settings in FIG. 14, will be explained with reference to FIGS. 15 and 16.

FJVKSSL: Kick Start Voltage System Selection

This is a register indicating a setting system for an initial value of a kick pulse, that is, a kick start voltage. For example, when one bit FJVKSSL is 0, the setting system is in a mode for setting a set fixed voltage value as a kick start voltage. In the case of this mode, the set voltage value means a voltage indicated by the register FJVKS. When FJVKSSL is 1, the setting system is in a mode for setting a voltage value, which is calculated according to a ratio to a voltage at the time of kick pulse drive force increase end (VKEND) in the previous focus jump, as a kick start voltage.

FJVKSA: Kick Start Voltage Kick Voltage Ratio

In the case of the mode of FJVKSSL=1, a kick start voltage kick voltage ratio is a set value of a ratio for calculating a kick start voltage. In other words, a kick start voltage is calculated by multiplying the voltage at the time of kick pulse voltage rise end (VKEND) in the previous focus jump by a ratio set in the register FJVKSA. It is possible to set a value of the ratio in 16 stages with 4 bits of the register FJVKSA.

FJVBSL: Brake Voltage System Selection

As explained in FIG. 8, a setting system for a voltage value of a brake pulse is selected by the register FJVBSL. In the example in FIG. 14, the register FJVBSL is expanded to 4 bits such that maximum sixteen setting systems for a voltage value of a brake pulse can be selected. In this embodiment, fifteen brake voltage systems are selected with the 4 bit value.

The respective fifteen brake voltage systems will be described later. Any one of the register FJVB for a brake voltage and the register FJVBA for a brake voltage kick voltage ratio is used for the respective voltage systems.

FJTBSL: Brake Period System Selection

Again, as explained in FIG. 8, setting for a mode of a brake pulse application period is performed by the register FJTBSL. In the example in FIG. 14, the register FJTBSL is expanded to 4 bits such that maximum sixteen setting systems for a brake pulse application period can be selected. In this embodiment, sixteen brake pulse application period systems are selected with the 4 bit value. The respective sixteen brake pulse application period systems will be described later. There are a system for defining brake pulse end timing and a system for defining brake pulse application time.

In addition, as a mode selected by the register FJTBSL, there is a mode for setting application time of a brake pulse with an arithmetic operation with a measurement value. A coefficient of arithmetic operation in that case is a value indicated by the register FJTBA of a brake time ratio.

FJTB: Brake Time

As a mode selected by the register FJTBSL, there is a mode for setting brake time as a fixed value. In that case, the brake time as the fixed value is time indicated in the register FJTB. For example, it is possible to set 8 stages of brake time with the 3 bit register FJTB.

Focus jump drive signals, which are generated by the focus jump logic 24b on the basis of the register setting in FIG. 14, will be explained with reference to FIGS. 15 and 16. FIG. 15 shows a drive signal waveform at the time of focus-up jump and FIG. 16 shows a drive signal waveform at the time of focus-down jump.

In the case of the first embodiment based on the register setting in FIG. 8, a kick start voltage is a fixed voltage value defined by the register FJVKS. In the case of this second embodiment, a kick start voltage system is selected by the register FJVKSSL.

As shown in FIGS. 15 and 16, one of two modes <KS1> and <KS2> is selected according to a value of the register FJVKSSL of kick start voltage system selection.

In the case of the mode <KS1>, a kick start voltage is set to a fixed value. In other words, the kick start voltage is set to a voltage value indicated by the register FJVKS. At the time of focus-up jump shown in FIG. 15, the kick start voltage is set to FJVKS. At the time of focus-down jump shown in FIG. 16, the kick start voltage is set to −FJVKS.

In the case of the mode <KS2>, the kick start voltage is set to a voltage value that is calculated according to a ratio to the voltage at the time of kick pulse drive force increase end (VKEND) in the previous focus jump. Therefore, at the time of the focus-up jump and the focus-down jump, the voltage at the time of drive force increase end (VKEND) is stored.

At the time of the focus-up jump shown in FIG. 15, a value, which is obtained by multiplying the voltage at the time of drive force increase end (VKEND) of a positive value in the previous focus-up jump by the register FJVKSA, is set as a kick start voltage.

At the time of the focus-down jump shown in FIG. 16, a value, which is obtained by multiplying the voltage at the time of drive force increase end (VKEND) of a negative value in the previous focus-down jump by the register FJVKSA, is set as a kick start voltage.

In FIGS. 15 and 16, the kick end voltage (FJVKE), the kick drive force acceleration setting (FJVKAC), the kick hold system (FJVHSL), and the hold voltage (FJVH or VKEND× FJVHA) are the same as those explained in the first embodiment. Thus, these are not explained repeatedly here.

In the second embodiment, there are fifteen brake voltage systems that are expanded by the register FJVBSL so as to be selectable. As shown in FIGS. 15 and 16, any one of fifteen modes <BV1> to <BV15> is selected as a brake voltage system according to a value of the register FJVBSL.

In the case of the mode <BV1>, a brake voltage is set to a fixed value. In other words, the brake voltage is set to a voltage value indicated by the register FJVB. At the time of the focus-up jump shown in FIG. 15, the brake voltage is set to −FJVB. At the time of the focus-down jump shown in FIG. 16, the brake voltage is set to FJVB.

In the case of the mode <BV2>, a brake voltage is set to a voltage value obtained by multiplication of the kick hold time Tcmp and a value of the register FJVBA. The kick hold time Tcmp is a measurement value from the point t11 to the point t12. As explained in the first embodiment, in the case of the focus-up jump, the kick hold time Tcmp is time measured from a rising edge to a falling edge of the FcmpH signal. In the case of the focus-down jump, the kick hold time Tcmp is time measured from a rising edge to a falling edge of the FcmpL signal. The kick hold time Tcmp indicates moving speed of the object lens 3a at the time of focus jump. The kick hold time Tcmp and the value of the register FJVBA are multiplied to be a voltage value. Thus, in the case of the focus-up jump, the brake voltage is calculated as −FJVBA×Tcmp. In the case of the focus-down jump, the brake voltage is calculated as FJVBA×Tcmp.

In the case of the mode <BV3>, a brake voltage is set to a voltage value obtained by division of a value of the register FJVBA and the kick hold time Tcmp. In the case of the focus-up jump, the brake voltage is calculated as −FJVBA/Tcmp. In the case of the focus-down jump, the brake voltage is calculated as FJVBA/Tcmp.

In the case of the mode <BV4>, a brake voltage is set to a voltage value obtained by multiplication of a value of the register FJVBA and the voltage at the time of kick pulse drive force increase end (VKEND). In both the cases of the focus-up jump and the focus-down jump, the brake voltage is calculated as FJVBAX(−VKEND). This is because, in the case of the focus-up jump, a brake pulse is a negative pulse and the voltage at the time of drive force increase end (VKEND) is a positive value and, in the case of the focus-down jump, a brake pulse is a positive pulse and the voltage at the time of drive force increase end (VKEND) is a negative value.

In the case of the mode <BV5>, a brake voltage is set to a voltage value obtained by division of a value of the register FJVBA and the voltage at the time of kick pulse drive force increase end (VKEND). In both the cases of the focus-up jump and the focus-down jump, the brake voltage is calculated as FJVBA/(−VKEND).

In the case of the mode <BV6>, a brake voltage is set to a voltage value obtained by multiplication of a value of the register FJVBA, the kick hold time Tcmp, and the voltage at the time of kick pulse drive force increase end (VKEND). In both the cases of the focus-up jump and the focus-down jump, the brake voltage is calculated as FJVBA×Tcmp×(−VKEND).

In the case of the mode <BV7>, a brake voltage is set to a voltage value obtained by multiplication and division of a value of the register FJVBA, the kick hold time Tcmp, and the voltage at the time of kick pulse drive force increase end (VKEND). In both the cases of the focus-up jump and the focus-down jump, the brake voltage is calculated as FJVBA× Tcmp/(−VKEND).

In the case of the mode <BV8>, a brake voltage is set to a voltage value obtained by multiplication and division of a value of the register FJVBA, the kick hold time Tcmp, and the voltage at the time of kick pulse drive force increase end (VKEND). In both the cases of the focus-up jump and the focus-down jump, the brake voltage is calculated as FJVBA×(−VKEND)/Tcmp.

In the case of the mode <BV9>, a brake voltage is set to a voltage value obtained by division of a value of the register FJVBA, the voltage at the time of kick pulse drive force increase end (VKEND), and the kick hold time Tcmp. In both the cases of the focus-up jump and the focus-down jump, the brake voltage is calculated as FJVBA/(−VKEND)/Tcmp.

In the case of the mode <BV10>, a brake voltage is set to a voltage value obtained by multiplication of the kick drive force increase time Tdrv and a value of the register FJVBA. The kick drive force increase time Tdrv is a measurement value from the point t10 to the point t11. As explained in the first embodiment, in the case of the focus-up jump, the kick drive force increase time Tdrv is time measured from start of kick pulse application to a rising edge of the FcmpH signal. In the case of the focus-down jump, the kick drive force increase time Tdrv is time measured from start of kick pulse application to a rising edge of the FcmpL signal. The kick drive force increase time Tdrv indicates time until confirmation of start of movement of the object lens 3a at the time of focus jump. This is also a value corresponding to a coefficient of static friction. However, in the case of the focus jump drive waveforms shown in (g) in FIG. 6 and (g) in FIG. 10, the time Tdrv is a kick pulse application period length and is equivalent to moving speed of the object lens 3a. In this mode <BV10>, the kick drive force increase time Tdrv and a value of the register FJVBA are multiplied to be a voltage value. Thus, in the case of the focus-up jump, the brake voltage is calculated as −FJVBA×Tdrv. In the case of the focus-down jump, the brake voltage is calculated as FJVBA×Tdrv.

In the case of the mode <BV11>, a brake voltage is set to a voltage value obtained by division of a value of the register FJVBA and the kick drive force increase time Tdrv. In the case of the focus-up jump, the brake voltage is calculated as −FJVBA/Tdrv. In the case of the focus-down jump, the brake voltage is calculated as FJVBA/Tdrv.

In the case of the mode <BV12>, a brake voltage is set to a voltage value obtained by multiplication of a value of the register FJVBA, the kick drive force increase time Tdrv, and the voltage at the time of kick pulse drive force increase end (VKEND). In both the cases of the focus-up jump and the focus-down jump, the brake voltage is calculated as FJVBA×Tdrv×(−VKEND).

In the case of the mode <BV13>, a brake voltage is set to a voltage value obtained by multiplication and division of a value of the register FJVBA, the kick drive force increase time Tdrv, and the voltage at the time of kick pulse drive force increase end (VKEND). In both the cases of the focus-up jump and the focus-down jump, the brake voltage is calculated as FJVBA×Tdrv/(−VKEND).

In the case of the mode <BV14>, a brake voltage is set to a voltage value obtained by multiplication and division of a value of the register FJVBA, the kick drive force increase time Tdrv, and the voltage at the time of kick pulse drive force increase end (VKEND). In both the cases of the focus-up jump and the focus-down jump, the brake voltage is calculated as FJVBA×(−VKEND)/Tdrv.

In the case of the mode <BV15>, a brake voltage is set to a voltage value obtained by division of a value of the register FJVBA, the voltage at the time of kick pulse drive force increase end (VKEND), and the kick drive force increase time Tdrv. In both the cases of the focus-up jump and the focus-down jump, the brake voltage is calculated as FJVBA/(−VKEND)/Tdrv.

In the second embodiment, there are sixteen brake period systems that are expanded by the register FJTBSL so as to be selectable. As shown in FIGS. 15 and 16, any one of sixteen modes <BT1> to <BT16> is selected as a brake period system according to a value of the register FJTBSL. In the mode <BT1>, end timing of a brake period is defined. In the modes <BT2> to <BT16>, a period length of the brake period is defined.

In the case of the mode <BT1>, a brake pulse is ended in synchronization with a falling edge of the Fcmp signal. The Fcmp signal in this context means the FcmpH signal in the case of the focus-up jump and the FcmpL signal in the case of the focus-down jump.

In the case of the mode <BT2>, a brake period is set to a fixed value. In other words, a brake pulse is applied for time stored as the register FJTB.

In the case of the mode <BT3>, a brake period is set to a time length obtained by multiplication of the kick hold time Tcmp and a value of the register FJTBA. The time length as the brake period is calculated as FJTBA×Tcmp.

In the case of the mode <BT4>, a brake period is set to a time length obtained by division of a value of the register FJTBA and the kick hold time Tcmp. The time length as the brake period is calculated as FJTBA/Tcmp.

In the case of the mode <BT5>, a brake period is set to a time length obtained by multiplication of a value of the register FJTBA and the voltage at the time of kick pulse drive force increase end (VKEND). In the case of the focus-up jump, the time length as the brake period is calculated as FJTBA×VKEND. In the case of the focus-down jump, the time length as the brake period is calculated as FJTBA×(−VKEND). In the case of the focus-up jump, the voltage at the time of drive force increase end (VKEND) is a positive value. In the case of the focus-down jump, the voltage at the time of drive force increase end (VKEND) is a negative value.

In the case of the mode <BT6>, a brake period is set to a time length obtained by division of a value of the register FJTBA and the voltage at the time of kick pulse drive force increase end (VKEND). In the case of the focus-up jump, the time length as the brake period is calculated as FJTBA/VKEND. In the case of the focus-down jump, the time length as the brake period is calculated as FJTBA/(−VKEND).

In the case of the mode <BT7>, a brake period is set to a time length obtained by multiplication of the kick hold time Tcmp and the voltage at the time of kick pulse drive force increase end (VKEND) In the case of the focus-up jump, the time length as the brake period is calculated as FJTBA×Tcmp×VKEND. In the case of the focus-down jump, the time length as the brake period is calculated as FJTBA×Tcmp×(−VKEND).

In the case of the mode <BT8>, a brake period is set to a time length obtained by multiplication and division of a value of the register FJVBA, the kick hold time Tcmp, and the voltage at the time of kick pulse drive force increase end (VKEND). In the case of the focus-up jump, the time length as the brake period is calculated as FJTBA×Tcmp/VKEND. In the case of the focus-down jump, the time length as the brake period is calculated as FJTBA×Tcmp/(−VKEND).

In the case of the mode <BT9>, a brake period is also set to a time length obtained by multiplication and division of a value of the register FJVBA, the kick hold time Tcmp, and the voltage at the time of kick pulse drive force increase end (VKEND). In the case of the focus-up jump, the time length as the brake period is calculated as FJTBA×VKEND/Tcmp. In the case of the focus-down jump, the time length as the brake period is calculated as FJTBA×(−VKEND)/Tcmp.

In the case of the mode <BT10>, a brake period is set to a time length obtained by division of a value of the register FJVBA, the voltage at the kick pulse drive force increase end (VKEND), and the kick hold time Tcmp. In the case of the focus-up jump, the time length as the brake period is calculated as FJTBA/VKEND/Tcmp. In the case of the focus-down jump, the time length as the brake period is calculated as FJTBA/(−VKEND)/Tcmp.

In the case of the mode <BT11>, a brake period is set to a time length obtained by multiplication of the kick drive force increase time Tdrv and a value of the register FJTBA. The time length as the brake period is calculated as FJTBA×Tdrv.

In the case of the mode <BT12>, a brake period is set to a time length obtained by division of a value of the register FJTBA and the kick drive force increase time Tdrv. The length as the brake period is calculated as FJTBA/Tdrv.

In the case of the mode <BT13>, a brake period is set to a time length obtained by multiplication of a value of the register FJBVA, the kick drive force increase time Tdrv, and the voltage at the time of kick pulse drive force increase end (VKEND). In the case of the focus-up jump, the time length as the brake period is calculated as FJTBA×Tdrv×VKEND. In the case of the focus-down jump, the time length as the brake period is calculated as FJTBA×Tdrv×(−VKEND).

In the case of the mode <BT14>, a brake period is set to a time length obtained by multiplication and division of a value of the register FJVBA, the kick drive force increase time Tdrv, and the voltage at the time of kick pulse drive force increase end (VKEND). In the case of the focus-up jump, the time length as the brake period is calculated as FJTBA×Tdrv/VKEND. In the case of the focus-down jump, the time length as the brake period is calculated as FJTBA×Tdrv×(−VKEND).

In the case of the mode <BT15>, a brake period is also set to a time length obtained by multiplication and division of a value of the register FJVBA, the kick drive force increase time Tdrv, and the voltage at the time of kick pulse drive force increase end (VKEND). In the case of the focus-up jump, the time length as the brake period is calculated as FJTBA×VKEND/Tdrv. In the case of the focus-down jump, the time length as the brake period is calculated as FJTBA×(−VKEND)/Tdrv.

In the case of the mode <BT16>, a brake period is set to a time length obtained by division of a value of the register FJVBA, the voltage at the time of kick pulse drive force increase end (VKEND), and the kick drive force increase time Tdrv. In the case of the focus-up jump, the time length as the brake period is calculated as FJTBA/VKEND/Tdrv. In the case of the focus-down jump, the time length as the brake period is calculated as FJTBA/(−VKEND)/Tdrv.

[2-2: Focus-Up Jump Operation]

In the second embodiment in which a variation of the focus jump drive signal waveform according to register setting is expanded as described above, processing of the focus-up jump executed by the focus jump logic 24b will be explained with reference to FIG. 17.

When a focus-up jump sequence from the layer 0 to the layer 1 is started, first, in step F301, the focus jump logic 24b judges a kick start voltage system from a value of the register FJVKSSL.

If the kick start voltage system indicated by the register FJVKSSL is the mode <KS1>, the focus jump logic 24b proceeds to step F302 and generates a kick start voltage as a fixed value for moving the object lens 3a in the layer 1 direction. The kick start voltage at this time is set to a set voltage value of the register (FJVKS).

If the kick start voltage system indicated by the register FJVKSSL is the mode <KS2>, the focus jump logic 24b proceeds to step F303 and generates a kick start voltage for moving the object lens 3a in the layer 1 direction as a voltage corresponding to the voltage at the time of kick drive force increase end VKEND in the previous focus-up jump. In other words, the kick start voltage at this time is set to a voltage value calculated as register (FJVKSA)×(previous VKEND).

Subsequently, in step F304, the focus jump logic 24b increases the kick drive force at acceleration set by the kick voltage acceleration (FJVKAC) until a rising edge of the FcmpL signal is detected or a kick voltage reaches an upper limit value (the kick end voltage (FJVKE)) while a rising edge of the FcmpL signal is not detected. In other words, the focus jump logic 24b raises the kick voltage. Note that it is also possible that the kick voltage acceleration (FJVKAC) is set to 0 and the kick drive force is not increased.

The focus jump logic 24b holds a voltage value at the point when the kick pulse drive force increase is ended as the voltage VKEND.

The focus jump logic 24b counts time from application of the start voltage in step F302 or F303 until the end of the kick drive force increase in step F304. The focus jump logic 24b holds a counted time value at the point when the kick pulse drive force increase is ended as the kick drive force increase time Tdrv.

In step F305, the focus jump logic 24b confirms a setting for the kick hold system (FJVHSL) and branches the processing. When a hold voltage is set to a set value as the kick hold system (FJVHSL=0), the focus jump logic 24b proceeds to step F307 and holds the kick pulse at a set voltage of the kick hold voltage (FJVH).

When the hold voltage is set according to the ratio to the voltage VKEND (FJVHA) as the kick hold system (FJVHSL=1), the focus jump logic 24b proceeds to step F305, calculates a hold voltage according to voltage VKEND×ratio (FJVHA), and holds the kick pulse at the voltage.

In step F308, the focus jump logic 24b stands by for falling edge timing of the FcmpL and, when a falling edge is detected, ends the kick pulse.

Note that the focus jump logic 24b starts measurement of the H level time Tcmp of the FcmpL signal from the point when a rising edge of the FcmpL signal is detected in step F304 or the like. When a falling edge of the FcmpL signal is detected in step F308, the focus jump logic 24b ends the measurement of the H level time Tcmp at the point and holds a measurement value as the hold time Tcmp.

Subsequently, the focus jump logic 24b sets a FcmpH signal mask period in step F309. For example, the focus jump logic 24b multiplies the time Tcmp by a value of the mask time Tcmp time ratio (FJMASk) to obtain mask time when the FcmpH signal is not monitored. Then, the focus jump logic 24b does not monitor the FcmpH signal until the FcmpH signal mask period elapses.

In step F310, the focus jump logic 24b confirms a setting for the brake voltage system selection (FJVBSL).

As a brake voltage system, one of the modes <BV1> to <BV15> shown in FIG. 15 is indicated by a value of the register FJVBSL.

The focus jump logic 24b proceeds to any one of steps F311 to F325 according to the designation of any one of the modes <BV1> to <BV15> and determines a brake voltage as described above. Then, the focus jump logic 24b generates a brake pulse of the determined voltage from the point when the rising edge of the FcmpH signal is detected.

In step F326, the focus jump logic 24b confirms a setting for the brake period system selection (FJTBSL).

As a brake period system, one of the modes <BT1> to <BT16> shown in FIG. 15 is indicated by a value of the register FJTBSL.

The focus jump logic 24b proceeds to any one of steps F327 to F342 according to the designation of any one of the modes <BT1> to <BT16> and determines a brake period system as described above. When the focus jump logic 24b proceeds to step F327 in the mode <BT1>, the focus jump logic 24b sets the falling edge of the FcmpH signal as brake pulse end timing as the brake period system. The focus jump logic 24b continues the brake pulse output until the falling edge of the FcmpH signal is detected. When the focus jump logic 24b proceeds to any one of steps F328 to F342 in any one of the modes <BT2>to <BT16>, the focus jump logic 24b executes the brake pulse output for the determined time length.

In step F343, the focus jump logic 24b confirms a setting for the sequence end system selection (FJSQEND).

In the case of the mode for setting brake pulse end timing as sequence end timing as the sequence end system (FJSQEND=0 or 1), the focus jump logic 24b proceeds to step F344. Then, at the point when the brake pulse output is ended, the focus jump logic 24b turns on the focus servo and ends the focus jump sequence.

In the case of the mode for setting falling edge timing of the FcmpH signal as sequence end timing as the sequence end system (FJSQEND=2), the focus jump logic 24b proceeds to step F345. At the point when the falling edge of the FcmpH signal is detected, the focus jump logic 24b turns on the focus servo and ends the focus jump sequence.

In the case of the mode for setting later one of brake pulse end timing and falling edge timing of the FcmpH signal as sequence end timing as the sequence end system (FJSQEND=3), the focus jump logic 24b proceeds to step F346. At the point when both end of the brake pulse output and the falling edge of the FcmpH signal are detected, the focus jump logic 24b turns on the focus servo and ends the focus jump sequence.

Figure 17:
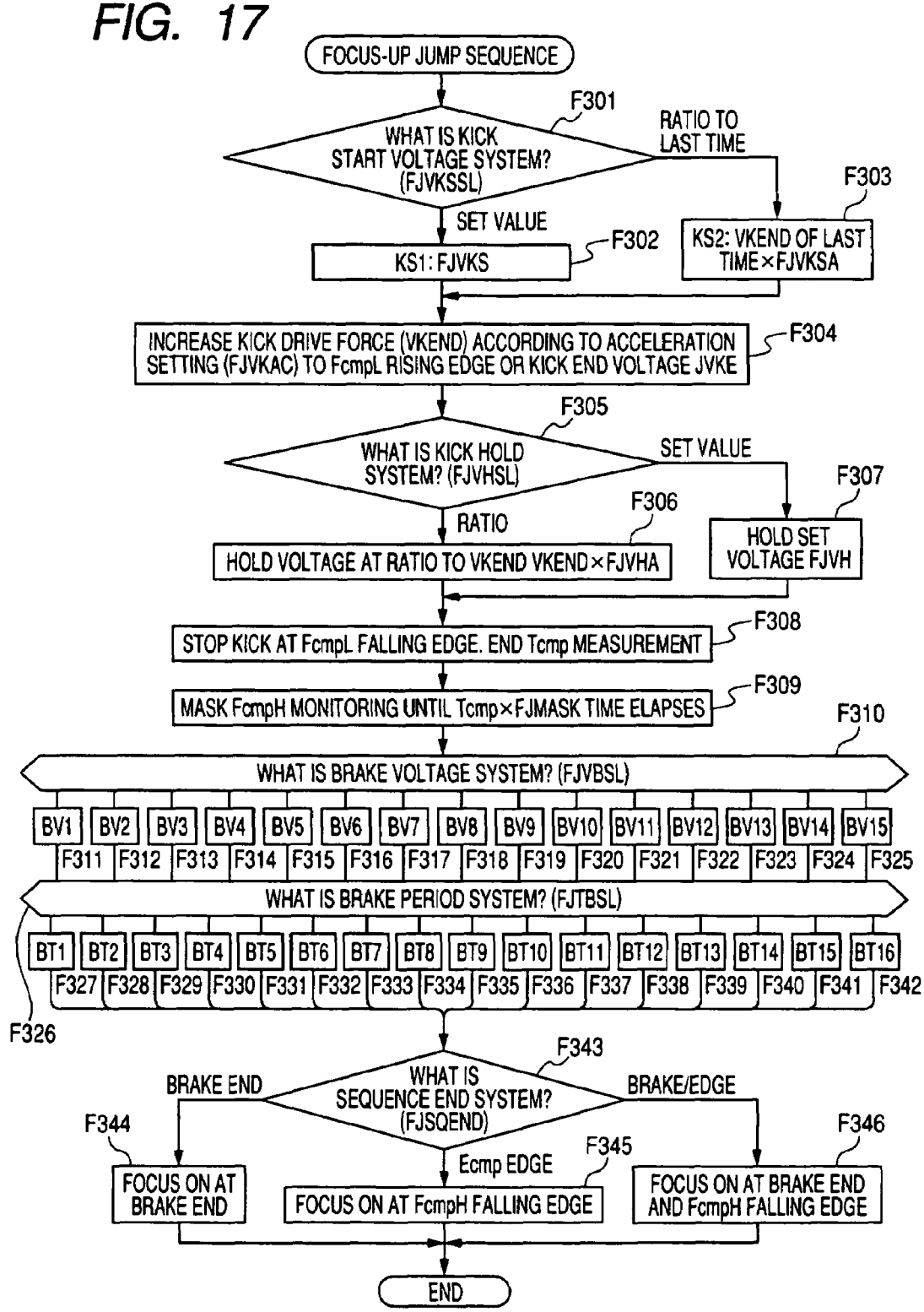
FIG. 17 is a flowchart of focus-up jump processing in the second embodiment.

After the register setting in FIG. 14 is performed, the focus jump logic 24b executes the focus jump sequence in FIG. 17 described above, whereby the focus-up jump from the layer 0 to the layer 1 is executed.

[2-3: Focus-Down Jump Operation]

Next, processing of the focus-down jump executed by the focus jump logic 24b will be explained with reference to FIG. 18.

When a focus-down jump sequence from the layer 1 to the layer 0 is started, first, in step F401, the focus jump logic 24b judges a kick start voltage system from a value of the register FJVKSSL.

If the kick start voltage system indicated by the register FJVKSSL is the mode <KS1>, the focus jump logic 24b proceeds to step F402 and generates a kick start voltage as a fixed value for moving the object lens 3a in the layer 0 direction. The kick start voltage at this time is set to a set voltage value of the register (FJVKS)×−1.

If the kick start voltage system indicated by the register FJVKSSL is the mode <KS2>, the focus jump logic 24b proceeds to step F403 and generates a kick start voltage for moving the object lens 3a in the layer 0 direction as a voltage corresponding to the voltage at the time of kick drive force increase end VKEND in the previous focus-down jump. In other words, the kick start voltage at this time is set to a voltage value calculated as register (FJVKSA)×previous VKEND.

Subsequently, in step F404, the focus jump logic 24b increases the kick drive force at acceleration set by the kick voltage acceleration (FJVKAC) until a rising edge of the FcmpH signal is detected or a kick voltage reaches a drive force upper limit value, that is, a kick end voltage (−FJVKE) while a rising edge of the FcmpH signal is not detected. In other words, the focus jump logic 24b lowers the kick voltage. Note that it is also possible that the kick voltage acceleration (FJVKAC) is set to 0 and the kick drive force is not increased.

The focus jump logic 24b holds a voltage value at the point when voltage fall for the kick pulse drive force increase is ended as the voltage VKEND.

The focus jump logic 24b counts time from application of the start voltage in step F402 or F403 until the end of the kick drive force increase in step F404. The focus jump logic 24b holds a counted time value at the point when the kick pulse drive force increase is ended as the kick drive force increase time Tdrv.

In step F405, the focus jump logic 24b confirms a setting for the kick hold system (FJVHSL) and branches the processing. When a hold voltage is set to a set value as the kick hold system (FJVJSL=0), the focus jump logic 24b proceeds to step F407 and holds the kick pulse at a set voltage of the kick hold voltage (−FJVH).

When the hold voltage is set according to the ratio to the voltage VKEND (FJVHA) as the kick hold system (FJVHSL=1), the focus jump logic 24b proceeds to step F405, calculates a hold voltage according to voltage VKEND×ratio (FJVHA), and holds the kick pulse at the voltage.

In step F408, the focus jump logic 24b stands by for falling edge timing of the FcmpH and, when a falling edge is detected, ends the kick pulse.

Note that the focus jump logic 24b starts measurement of the H level time Tcmp of the FcmpH signal from the point when a rising edge of the FcmpH signal is detected in step F404 or the like. When a falling edge of the FcmpH signal is detected in step F408, the focus jump logic 24b ends the measurement of the H level time Tcmp at the point and holds a measurement value as the hold time Tcmp.

Subsequently, the focus jump logic 24b sets a FcmpL signal mask period in step F409. For example, the focus jump logic 24b multiplies the time Tcmp by a value of the mask time Tcmp time ratio (FJMASk) to obtain mask time when the FcmpL signal is not monitored. Then, the focus jump logic 24b does not monitor the FcmpL signal until the FcmpL signal mask period elapses.

In step F410, the focus jump logic 24b confirms a setting for the brake voltage system selection (FJVBSL).

As a brake voltage system, one of the modes <BV1> to <BV15> shown in FIG. 16 is indicated by a value of the register FJVBSL.

The focus jump logic 24b proceeds to any one of steps F411 to F425 according to the designation of any one of the modes <BV1> to <BV15> and determines a brake voltage as described above. Then, the focus jump logic 24b generates a brake pulse of the determined voltage from the point when the rising edge of the FcmpL signal is detected.

In step F426, the focus jump logic 24b confirms a setting for the brake period system selection (FJTBSL).

As a brake period system, one of the modes <BT1> to <BT16> shown in FIG. 16 is indicated by a value of the register FJTBSL.

The focus jump logic 24b proceeds to any one of steps F427 to F442 according to the designation of any one of the modes <BT1> to <BT16> and determines a brake period system as described above. When the focus jump logic 24b proceeds to step F427 in the mode <BT1>, the focus jump logic 24b sets the falling edge of the FcmpL signal as brake pulse end timing as the brake period system. The focus jump logic 24b continues the brake pulse output until the falling edge of the FcmpL signal is detected. When the focus jump logic 24b proceeds to any one of steps F428 to F442 in any one of the modes <BT2> to <BT16>, the focus jump logic 24b executes the brake pulse output for the determined time length.

In step F443, the focus jump logic 24b confirms a setting for the sequence end system selection (FJSQEND).

In the case of the mode for setting brake pulse end timing as sequence end timing as the sequence end system (FJSQEND=0 or 1), the focus jump logic 24b proceeds to step F444. Then, at the point when the brake pulse output is ended, the focus jump logic 24b turns on the focus servo and ends the focus jump sequence.

In the case of the mode for setting falling edge timing of the FcmpL signal as sequence end timing as the sequence end system (FJSQEND=2), the focus jump logic 24b proceeds to step F445. At the point when the falling edge of the FcmpL signal is detected, the focus jump logic 24b turns on the focus servo and ends the focus jump sequence.

In the case of the mode for setting later one of brake pulse end timing and falling edge timing of the FcmpL signal as sequence end timing as the sequence end system (FJSQEND=3), the focus jump logic 24b proceeds to step F446. At the point when both end of the brake pulse output and the falling edge of the FcmpL signal are detected, the focus jump logic 24b turns on the focus servo and ends the focus jump sequence.

Figure 18:
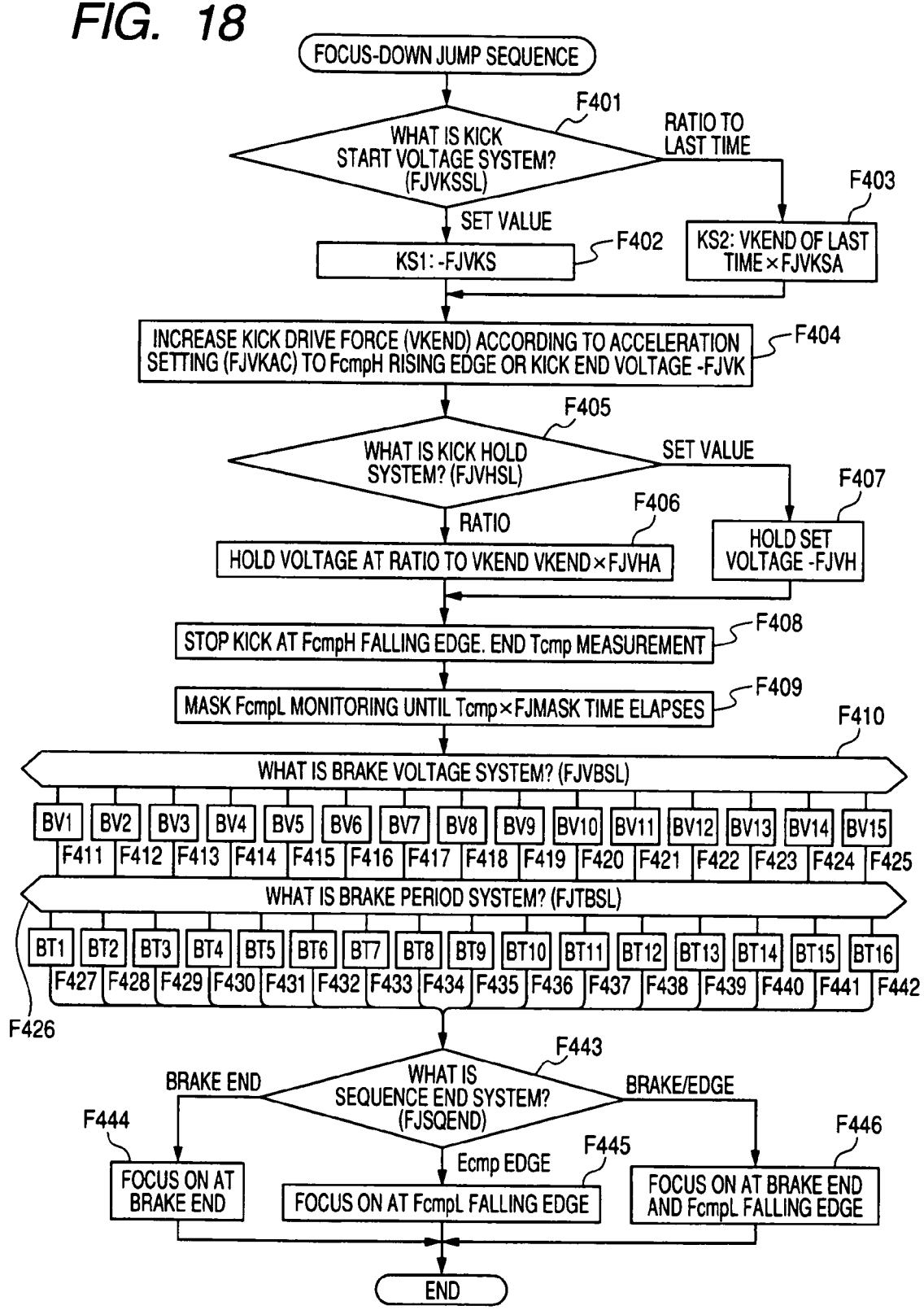
FIG. 18 is a flowchart of focus-down jump processing in the second embodiment.

After the register setting in FIG. 14 is performed, the focus jump logic 24b executes the focus jump sequence in FIG. 18 described above, whereby the focus-down jump from the layer 1 to the layer 0 is executed.

[2-4: Advantages and Modifications of the Second Embodiment]

According to the second embodiment described above, it is possible to obtain the same advantages as the first embodiment and realize stabilization of a focus jump operation.

In addition, since focus jump drive signal waveforms can be set in more various ways by the resister settings, it is possible to flexibly cope with a friction characteristic and operation responsiveness of the biaxial mechanism 3e, a type of a reproduction object disk, a model as a reproduction apparatus, a change and an upgrade of a pickup mounted on the identical model, and the like.

In particular, compared with the first embodiment, it is possible to generate focus jump drive signal waveforms corresponding to models of systems and realize stable focus jump for each model according to diversification of setting of an initial value as a kick start voltage, a brake voltage, and a brake period.

Further, in particular, in the second embodiment, it is possible to reflect the previous voltage at the time of kick drive force increase end on a setting as a kick start voltage. This also makes it possible to obtain an advantage of optimization the kick start voltage corresponding to aged deterioration of an apparatus and an environmental change.

It is also made possible to reflect the hold time Tcmp, the kick drive force increase time Tdrv, an the drive force increase end time voltage VKEND as a setting of a brake voltage and a brake period, that is, brake voltage application time.

The hold time Tcmp is equivalent to moving speed of the object lens 3a at the time of focus jump. The kick drive force increase time Tdrv, which is time until confirmation of start of movement of the object lens 3a, represents a coefficient of friction and focus jump responsiveness. Moreover, the kick drive force increase time Tdrv represents moving speed of the object lens 3a depending on a kick pulse waveform. Therefore, it is possible to perform a more accurate and more stable focus jump operation by reflecting the hold time Tcmp and the kick drive force increase time Tdrv on a brake voltage and a brake period in addition to the drive force increase end time voltage VKEND. For example, when object lens moving speed is high, it is also possible to perform an operation for increasing the brake voltage.

Note that, in the embodiments, the modes <BV1> to <BV15> can be selected for the brake voltage system and the mode <BT1> to <BT16> can be selected for the brake period system. However, the number of selectable modes and an arithmetic operation system for determining a brake voltage and a brake period can be considered in various ways. For example, it is possible that the kick drive force increase time Tdrv is not used and the modes <BV1> to <BV9> can be selected for the brake voltage system and the modes <BT1> to <BT10> can be selected for the brake period system. Conversely, it is also possible that the hold time Tcmp is not used.

Moreover, it is conceivable to provide a mode for performing an arithmetic operation for determining a brake voltage and a brake period using measurement time from the point t10 to the point t12 in FIGS. 15 and 16, that is, time of Tdrv+Tcmp as a value of kick drive time without using the kick drive force increase time Tdrv and the hold time Tcmp.

In addition, the number of bits of the respective registers only has to be changed and new registers only have to be provided according to those changes.

Incidentally, in the first and the second embodiments, the mode for multiplying the drive force increase end time voltage VKEND by the register FJVHA is indicated as one of the modes for determining a hold voltage. In this case, a value of the register FJVHA is set in a range of 0 to 1 in FIGS. 8 and 14. Then, in this case, the hold voltage is typically set to a voltage value equal to or lower than the drive force increase end time voltage VKEND.

Figure 19:
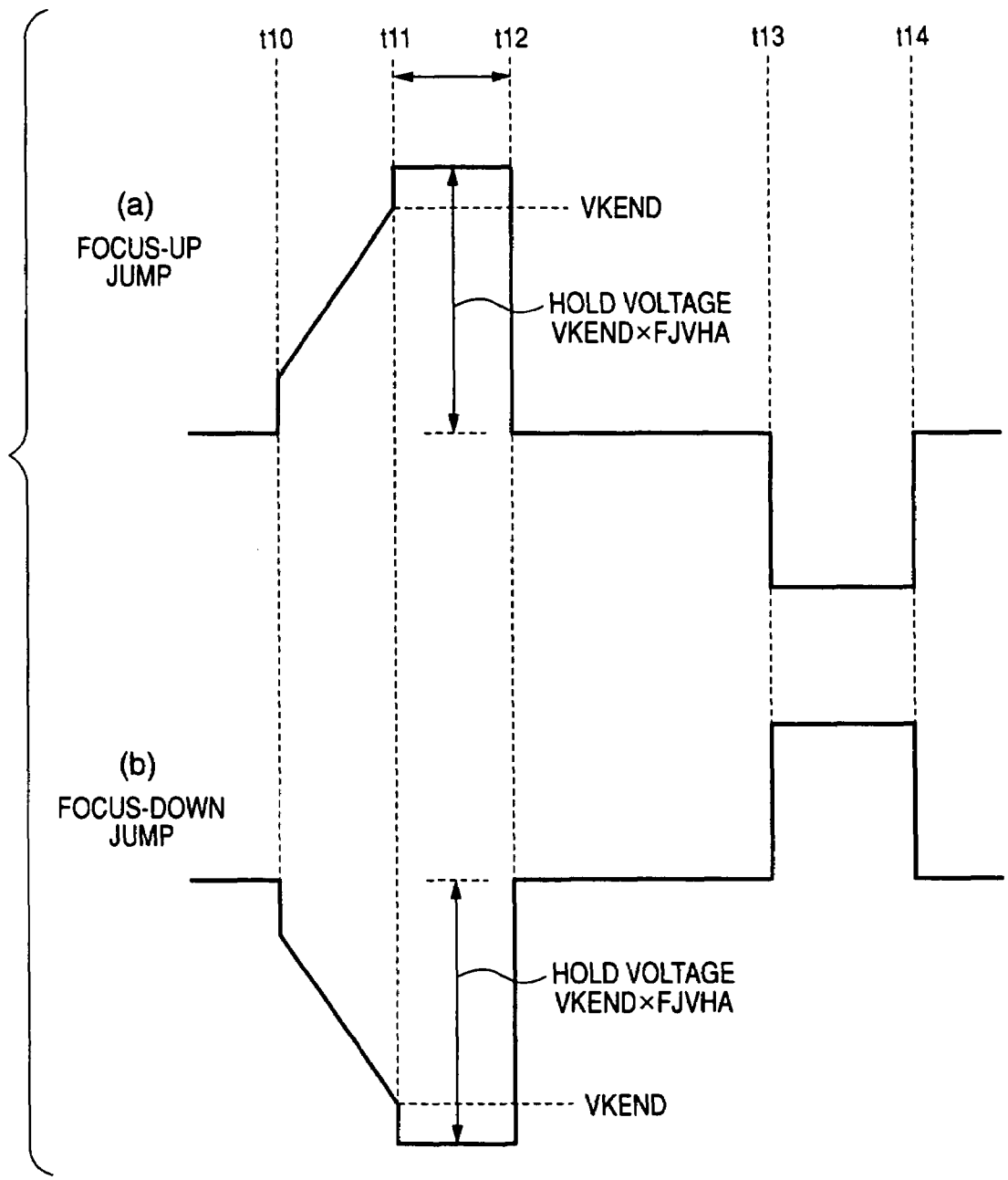
FIG. 19 is a diagram for explaining a focus jump drive signal waveform in a modification of the embodiments.

However, depending on an operation characteristic of the biaxial mechanism 3e, appropriate focus jump could be executed when a drive force generated by a hold voltage is set higher than a drive force of the drive force increase end time voltage VKEND. (a) and (b) in FIG. 19 show focus jump drive signal waveforms in which a drive force generated by a hold voltage is set higher than a drive force of the drive force increase end time voltage VKEND in the focus-up jump and the focus-down jump, respectively.

In order to obtain such focus jump drive signal waveforms, a range in which a value of the register FJVHA can be set only has to be expanded to a value larger than 1. For example, if a range in which a value of the register FJVHA can be set is 0 to 1.5, as shown in FIG. 19, it is possible to give a hold voltage having a higher drive force than the drive force increase end time voltage VKEND.

Next, a surf jump operation, which can be applied in the case of the focus jump in the first and the second embodiments, will be explained.

Figure 21:
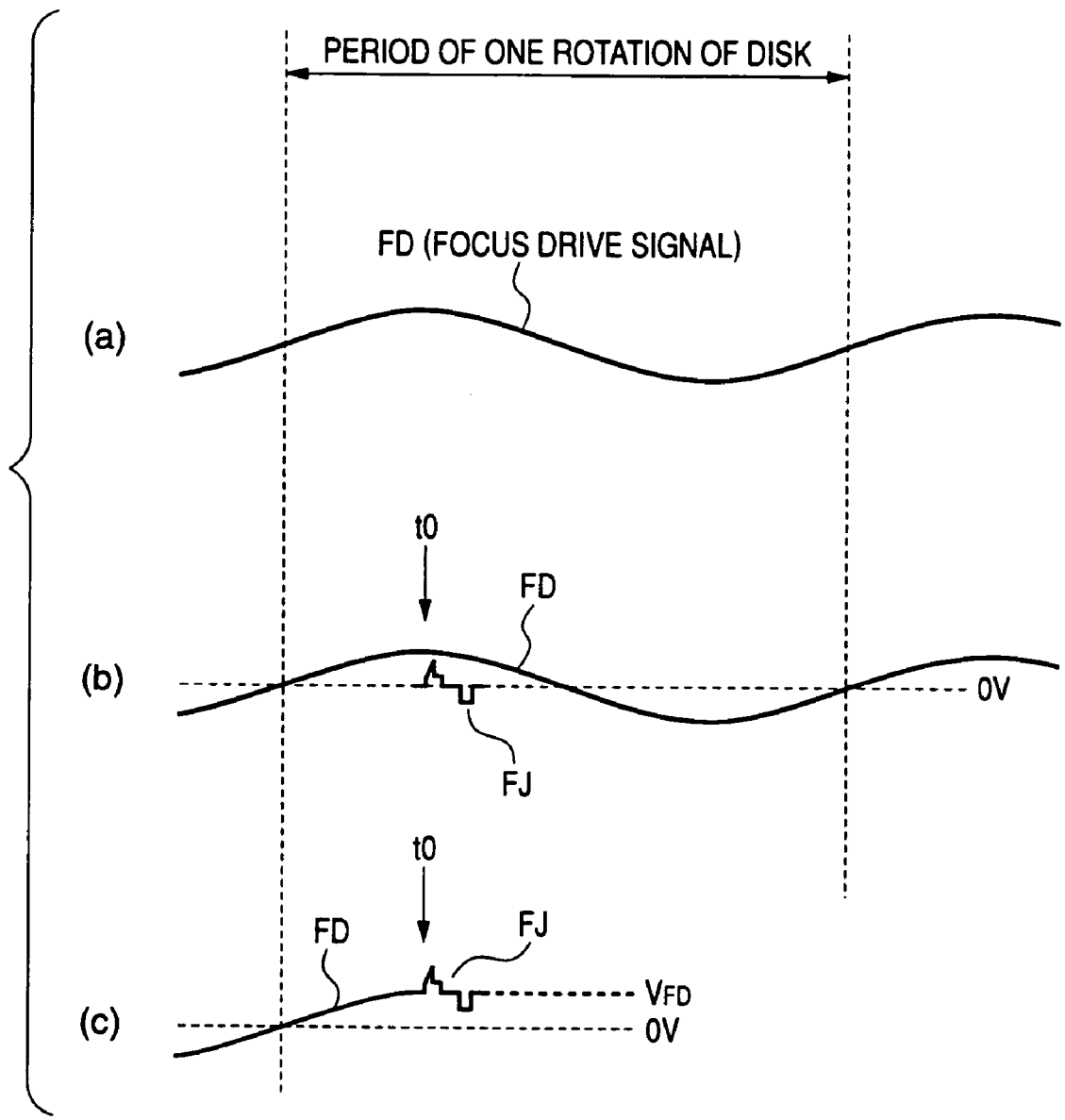
FIG. 21 is a diagram for explaining the surf jump at the time of the focus jump in the embodiments.

(a) in FIG. 21 shows a focus drive signal for driving the biaxial mechanism 3e in a focus direction. The focus drive signal shown in (a) in FIG. 21 is a focus drive signal at the time of usual reproduction, that is, at the time when the focus servo is on. (a) in FIG. 21 shows a state in which the focus drive signal fluctuates at a period of one rotation of the disk 1 in order to cause a focus position to follow surface wobbling of the disk 1.

Here, it is assumed that the focus jump is executed at a certain point t0. In this case, if a focus drive signal output for focus servo control from the servo filter 24a is set to off and a focus jump drive signal of a 0V reference generated from the focus jump logic 24b is outputted in that state, a phenomenon shown in (b) in FIG. 21 may occur. If an amplitude value of a focus drive signal FD is increased to a relatively large value by the focus servo at the point t0, a focus jump drive signal FJ may be decreased to a level buried under the focus drive signal FD immediately before switching. In addition, even if the focus jump drive signal FJ is not so low as to be buried under the focus drive signal FD, naturally, the focus drive signal FD immediately before switching to the focus jump is not always at the 0V level.

Since the focus drive signal FD is typically at a level for following a focus position at every point of time thereof, when the focus servo is switched to the focus jump, it may be impossible to execute accurate focus jump unless a jump pulse included to the level of the focus drive signal FD at the point is outputted.

Thus, when the focus jump is executed at the point t0, as shown in (c) in FIG. 21, a focus jump drive signal FJ is outputted with a level VFD of the immediately preceding focus drive signal FD as a reference. Consequently, accurate focus jump is executed. The focus jump, on which the immediately preceding level of the focus drive signal FD for servo control is reflected in this way, is referred to as surf jump.

Figure 20:
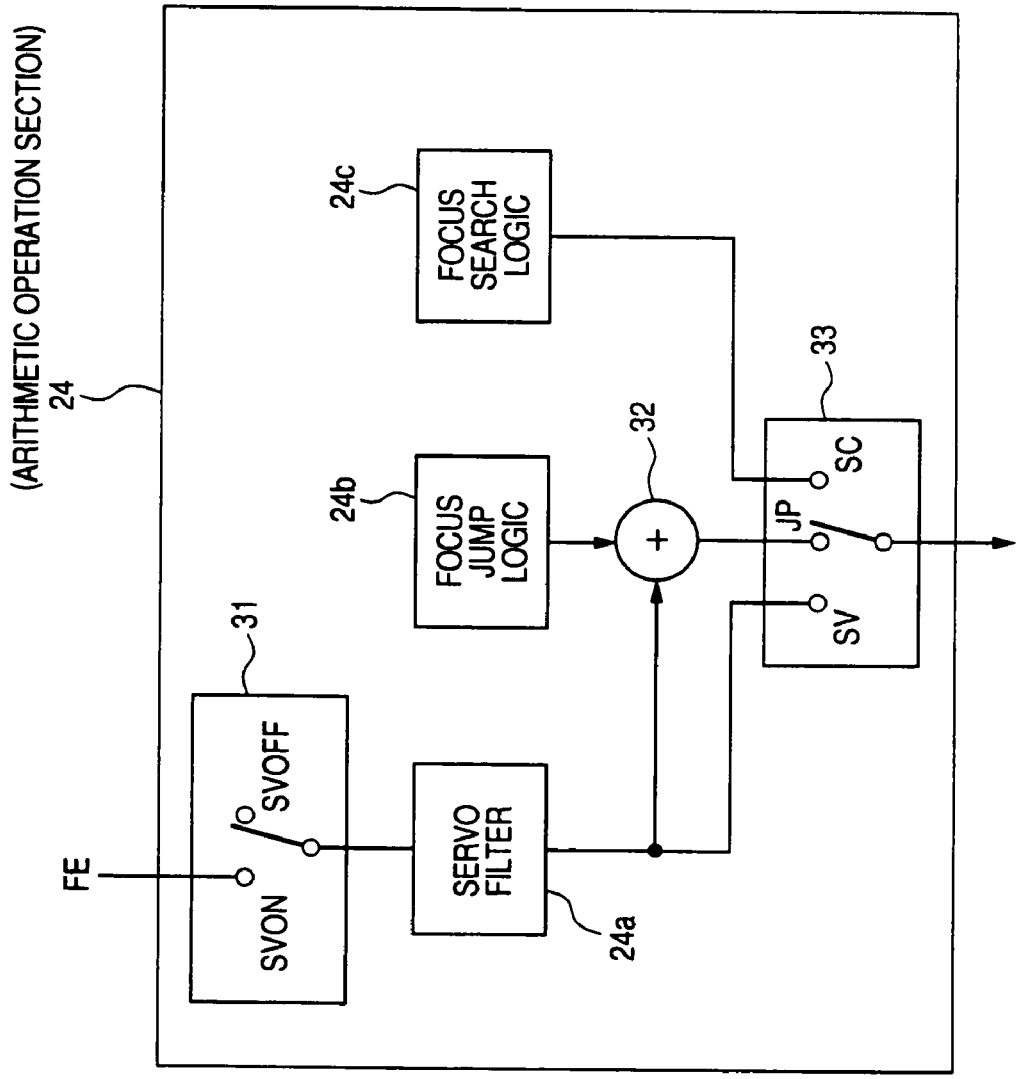
FIG. 20 is a diagram for explaining a structure for surf jump at the time of focus jump in the embodiments.

FIG. 20 shows a structure for executing the focus jump as this surf jump. FIG. 20 shows a structure of the arithmetic operation section 24 in the servo control section 10 shown in FIG. 5. As described above, the arithmetic operation section 24 includes the servo filter 24a that generates a focus servo signal on the basis of the focus error signal FE, the focus jump logic 24b that generates a focus jump signal with the processing explained in the first and the second embodiments, and the focus search logic 24c that generates a focus search signal for a focus search operation.

In a period in which the focus servo is turned on, a switch 31 is connected to a terminal SVON and a switch 33 is connected to a terminal SV. Consequently, the focus servo signal, which is generated by the servo filter 24a on the basis of the focus error signal FE, is supplied to the PWM modulation section 25 in FIG. 5.

In a period in which the focus search for drawing in the focus servo is performed, the switch 33 is connected to a terminal SC. Consequently, the focus search signal, which is outputted by the focus search logic 24c, is supplied to the PWM modulation section 25.

When the focus jump is performed, the switch 31 is switched to a terminal SVOFF and the switch 33 is connected to a terminal JP. Then, the focus jump logic 24b generates a focus jump drive signal with the processing described above. A signal, which is obtained by adding an output of the servo filter 24a to the focus jump drive signal in an adder 32, is supplied to the PWM modulation section 25 via the switch 33.

At this point, the servo filter 24a outputs a state of zero input because input of the focus error signal FE is cut off. In other words, the servo filter 24a outputs a focus servo signal of a value at an immediately preceding servo drive signal level. Therefore, a focus jump drive signal, which is outputted from the arithmetic operation section 24 by the addition processing in the adder 32, changes to a signal waveform with the immediately preceding focus drive signal level added as an offset as shown in (c) in FIG. 21. Consequently, the surf jump is realized.

The focus jump operation in the respective embodiments of the invention is executed as the surf jump in the structure of FIG. 20 to be more stable.

The embodiments have been explained. However, it is possible to apply the focus jump system according to the embodiments to not only the reproduction apparatus but also to a recording/reproduction apparatus.

In addition, the reproduction apparatus according to the embodiments is suitable as a reproduction apparatus and a recording/reproduction apparatus for not only the disk 1 but also other types of recording media such as an optical disk, a magneto-optical disk, and an optical card having two recording layers.

Moreover, it is needless to mention that the invention can be applied as a reproduction apparatus and a focus jump method for various recording media having a multilayer structure with three or more recording layers.

This application contains subject matter related to Japanese Patent Applications JP2004-126371 and JP2005-037458 filed in the Japanese Patent Office on Apr. 22, 2004 and Feb. 15, 2005, respectively, the entire contents of which being incorporated herein by reference.

It should be understood by those skilled in the art that various modifications, combinations, sub-combinations, and alterations may occur depending on design requirements and other factors insofar as they are within the scope of the appended claims or the equivalents thereof.

What we claim is:

1. A reproduction apparatus that reproduces information recorded in a recording medium having plural recording layers, comprising:
    an optical head means for irradiating laser beams on the respective recording layers with an object lens as an output end and detecting reflected light information of the laser beams to read out information recorded in the respective recording layers;
    a shaft sliding type focus actuator means for holding the object lens, said actuator means movable in a direction in which the object lens approaches and separates from the recording medium;
    a focus servo means for generating a focus servo drive signal on the basis of a focus error signal, which is obtained from the reflected light information read out by the optical head means, and driving the focus actuator means such that a focus state of the laser beams is kept in a state of focus on a recording layer on which the reproduction is performed; and
    a focus jump control means for generating a kick signal for starting focus jump movement by the focus actuator means and a brake signal for ending the focus jump movement by the focus actuator means when the state of focus on a certain recording layer is shifted to a state of focus on another recording layer,
    wherein the focus jump control means calculates the kick signal such that a magnitude of the kick signal continuously rises from an initial value to a maximal value during a drive period.

2. A reproduction apparatus according to claim 1, wherein the focus jump control means ends the drive period and the increase in the magnitude of the kick signal when the start of the focus jump movement is confirmed.

3. A reproduction apparatus according to claim 1, wherein the focus jump control means sets the initial value of the magnitude of the kick signal to a calculated value that is calculated using a fixed value set in advance or a value measured at the time of focus jump in the past.

4. A reproduction apparatus according to claim 1, wherein, after ending the drive period with the increase in the magnitude of the kick signal, the focus jump control means sets the magnitude of the kick signal to a fixed non-zero voltage level.

5. A reproduction apparatus according to claim 1, wherein, after ending the drive period with the increase in the magnitude of the kick signal, the focus jump control means sets the magnitude of the kick signal to a non-zero level that is calculated using a level at the time when the increase is ended.

6. A reproduction apparatus according to claim 1, wherein the focus jump control means sets the brake signal to a signal of a set level.

7. A reproduction apparatus according to claim 1, wherein the focus jump control means sets the brake signal to a signal of a level that is calculated using the maximal value at the time when the drive period is ended.

8. A reproduction apparatus according to claim 1, wherein the focus jump control means sets the brake signal to a signal of a level that is calculated using a time value measured during the drive period of application of the kick signal.

9. A reproduction apparatus according to claim 1, wherein the focus jump control means generates the brake signal during a period that is calculated using the time value measured during the drive period of application of the kick signal.

10. A reproduction apparatus according to claim 1, wherein the focus jump control means generates the brake signal during a period that is calculated using the level at the time when the increase in the magnitude of the kick signal is ended.

11. A focus jump method of giving a focus jump drive signal including a kick signal and a brake signal to a shaft sliding type focus actuator, which holds an object lens serving as an output end of laser beams in a direction in which the object lens approaches and separates from a recording medium, and executing focus jump in order to shift a focus state of laser beams from a state of focus on a certain recording layer to a state of focus on another recording layer with respect to a recording medium having plural recording layers for recording or reproducing information by irradiation of laser beams, comprising:
 continuously increasing a magnitude of a kick signal from an initial value to a maximal value during a drive period for causing the focus actuator to start a focus jump movement;
 maintaining the kick signal at a predetermined level; and
 generating the brake signal for causing the focus actuator to stop the focus jump movement.

12. A focus jump method according to claim 11, wherein the drive period and the increase in the magnitude of the kick signal is ended when the start of the focus jump movement is confirmed.

13. A focus jump method according to claim 11, wherein in the increasing a magnitude, the initial value of the magnitude of the kick signal is set to a calculated value that is calculated using a fixed value set in advance or a value measured at the time of focus jump in the past.

14. A focus jump method according to claim 11, wherein the magnitude of the kick signal is set to a set fixed non-zero voltage level in the maintaining.

15. A focus jump method according to claim 11, wherein the maintaining includes setting the magnitude to a level that is calculated using the magnitude of the kick signal at the time of end of the drive period.

16. A focus jump method according to claim 11, wherein, in the generating, a brake signal of a set level is generated.

17. A focus jump method according to claim 11, wherein, in the generating, a brake signal of a level, which is calculated using the maximal value of the kick signal at the time of the end of the drive period is generated.

18. A focus jump method according to claim 11, wherein, in the generating, a brake signal of a level, which is calculated using a time value measured during the drive period or during the maintaining, is generated.

19. A focus jump method according to claim 11, wherein, in the generating, the brake signal is generated during a period that is calculated using a time value measured during the drive period or during the maintaining.

20. A focus jump method according to claim 11, wherein, in the generating, the brake signal is generated during a period that is calculated using the maximal value of the kick signal at the time of the end of the drive period.

21. A reproduction apparatus configured to reproduce information recorded in a recording medium that includes plural recording layers, said reproduction apparatus comprising:
 an optical head configured to irradiate laser beams on the respective recording layers with an object lens as an output end and detect reflected light information of the laser beams to read information recorded in the respective recording layers;
 a shaft sliding type focus actuator configured to hold the object lens and move in a direction in which the object lens approaches and separates from the recording medium;
 a focus servo section configured to generate a focus servo drive signal on the basis of a focus error signal, which is obtained from the reflected light information read by the optical head, and drive the focus actuator such that a focus state of the laser beams is kept in a state of focus on a recording layer on which the reproduction is performed; and
 a focus jump control section configured to generate a kick signal to start a focus jump movement by the focus actuator and a brake signal to end the focus jump movement by the focus actuator when the state of focus on a certain recording layer is shifted to a state of focus on another recording layer,
 wherein the focus jump control section is further configured to calculate the kick signal such that a magnitude of the kick signal continuously rises from an initial value to a maximal value during a drive period.

22. The reproduction apparatus according to claim 21, wherein, after ending the drive period increasing the magnitude of the kick signal, the focus jump control section is configured to set the magnitude of the kick signal to a fixed non-zero voltage level.

* * * * *